(12) United States Patent
Eu et al.

(10) Patent No.: US 12,260,397 B2
(45) Date of Patent: Mar. 25, 2025

(54) SINGLE PAYMENT VALIDATION GATEWAY

(71) Applicant: ADP, Inc., Roseland, NJ (US)

(72) Inventors: Isabel Eu, Atlanta, GA (US); Jonathan Spear, Atlanta, GA (US); Cindy Kim-Spann, Woodstock, GA (US); Connie Hickey, Atlanta, GA (US); Nicole Gerhard, Alpharetta, GA (US)

(73) Assignee: ADP, Inc., Roseland, NJ (US)

( * ) Notice: Subject to any disclaimer, the term of this patent is extended or adjusted under 35 U.S.C. 154(b) by 282 days.

(21) Appl. No.: 16/012,722

(22) Filed: Jun. 19, 2018

(65) Prior Publication Data
US 2019/0385152 A1  Dec. 19, 2019

(51) Int. Cl.
| G06Q 20/36 | (2012.01) |
| G06Q 20/22 | (2012.01) |
| G06Q 20/32 | (2012.01) |
| G06Q 20/34 | (2012.01) |
| G06Q 20/42 | (2012.01) |
| G06Q 30/0207 | (2023.01) |

(52) U.S. Cl.
CPC ........... *G06Q 20/36* (2013.01); *G06Q 20/227* (2013.01); *G06Q 20/3274* (2013.01); *G06Q 20/341* (2013.01); *G06Q 20/42* (2013.01); *G06Q 30/0215* (2013.01)

(58) Field of Classification Search
CPC .............................. G06Q 20/36; G06Q 20/227
USPC .......................................................... 705/17
See application file for complete search history.

(56) References Cited

U.S. PATENT DOCUMENTS

| 5,748,737 | A | 5/1998 | Daggar | |
| 6,607,136 | B1* | 8/2003 | Atsmon | G06F 21/34 |
| | | | | 235/487 |
| 7,413,113 | B1 | 8/2008 | Zhu | |
| 9,444,824 | B1* | 9/2016 | Balazs | H04L 63/08 |
| 9,760,871 | B1* | 9/2017 | Pourfallah | G06Q 20/3276 |
| 10,237,256 | B1* | 3/2019 | Pena | H04W 12/08 |
| 10,527,179 | B2* | 1/2020 | Bucher | F16K 5/0694 |
| 2011/0218911 | A1 | 9/2011 | Spodak | |
| 2012/0066044 | A1* | 3/2012 | Honnef | G06Q 30/0222 |
| | | | | 705/14.23 |

(Continued)

FOREIGN PATENT DOCUMENTS

JP    H10228551    *  8/1998

OTHER PUBLICATIONS

Howell, "The future of payments," Information Technology Faculty, ICAEW, 2016, 26 pages.

(Continued)

*Primary Examiner* — Luna Champagne
(74) *Attorney, Agent, or Firm* — Foley & Lardner LLP

(57) ABSTRACT

A method, computer system, and computer program product for consolidating financial transactions of an employee in a payment technology gateway. The payment technology gateway comprises an electronic wallet linked to a payment technology application and a paycard linked to the payment technology application. The payment technology gateway is configured to be a single gateway through which the employee conducts financial transactions on a number of accounts using the electronic wallet and the paycard. Each financial transaction is validated by the payment technology gateway.

20 Claims, 18 Drawing Sheets

(56) References Cited

U.S. PATENT DOCUMENTS

| | | | |
|---|---|---|---|
| 2013/0226805 A1* | 8/2013 | Griffin | G06Q 20/4037 |
| | | | 705/44 |
| 2014/0019352 A1* | 1/2014 | Shrivastava | G06Q 20/36 |
| | | | 705/41 |
| 2014/0222597 A1* | 8/2014 | Nadella | G06Q 20/227 |
| | | | 705/21 |
| 2014/0279474 A1* | 9/2014 | Evans | G06Q 20/40 |
| | | | 705/41 |
| 2015/0012425 A1* | 1/2015 | Mathew | G06Q 20/36 |
| | | | 705/41 |
| 2015/0120472 A1* | 4/2015 | Aabye | G06Q 20/40 |
| | | | 705/16 |
| 2015/0294293 A1 | 10/2015 | Signarsson | |
| 2017/0041296 A1* | 2/2017 | Ford | H04W 12/06 |
| 2018/0039989 A1* | 2/2018 | Beye | H04L 67/10 |
| 2018/0315051 A1* | 11/2018 | Hurley | G06Q 20/4016 |
| 2019/0122222 A1* | 4/2019 | Uechi | G06Q 20/10 |
| 2019/0147515 A1* | 5/2019 | Hurley | G06Q 30/0613 |
| | | | 705/44 |
| 2020/0065841 A1* | 2/2020 | Hernandez | G06Q 30/0601 |

OTHER PUBLICATIONS

"Deliver a Truly Digital Wallet Experience: Powering customer engagement and business growth," Infosys Finacle, EdgeVerve Systems Limited, 2016, 8 pages.

"Mobile and Digital Wallets: U.S. Landscape and Strategic Considerations for Merchants and Financial Institutions," U. S. Payments Forum and Secure Technology Alliance, Jan. 2018, 50 pages.

* cited by examiner

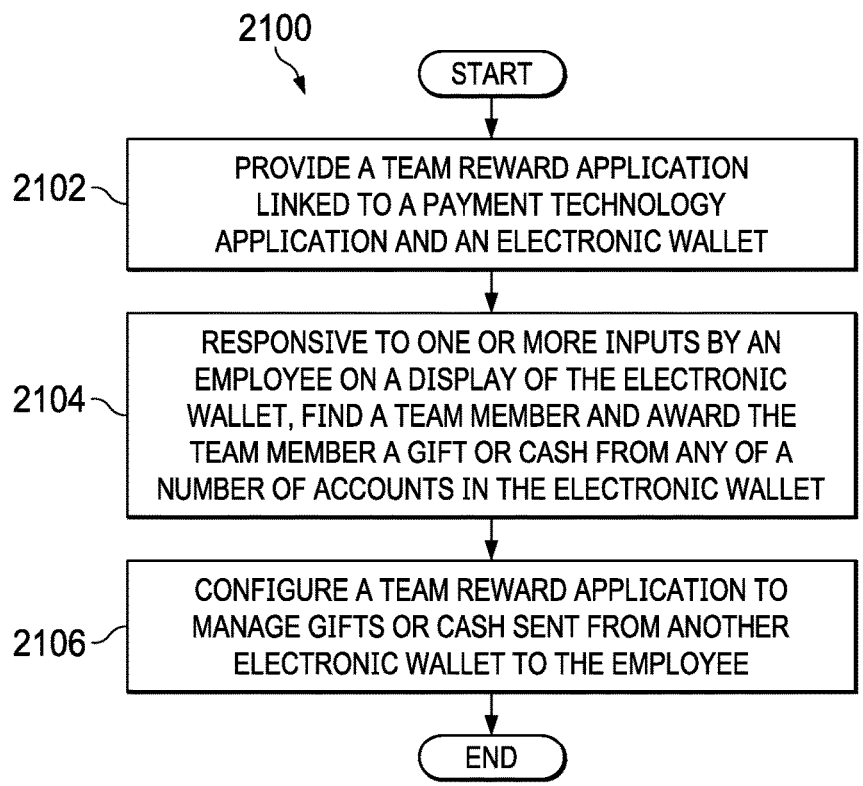
FIG. 21
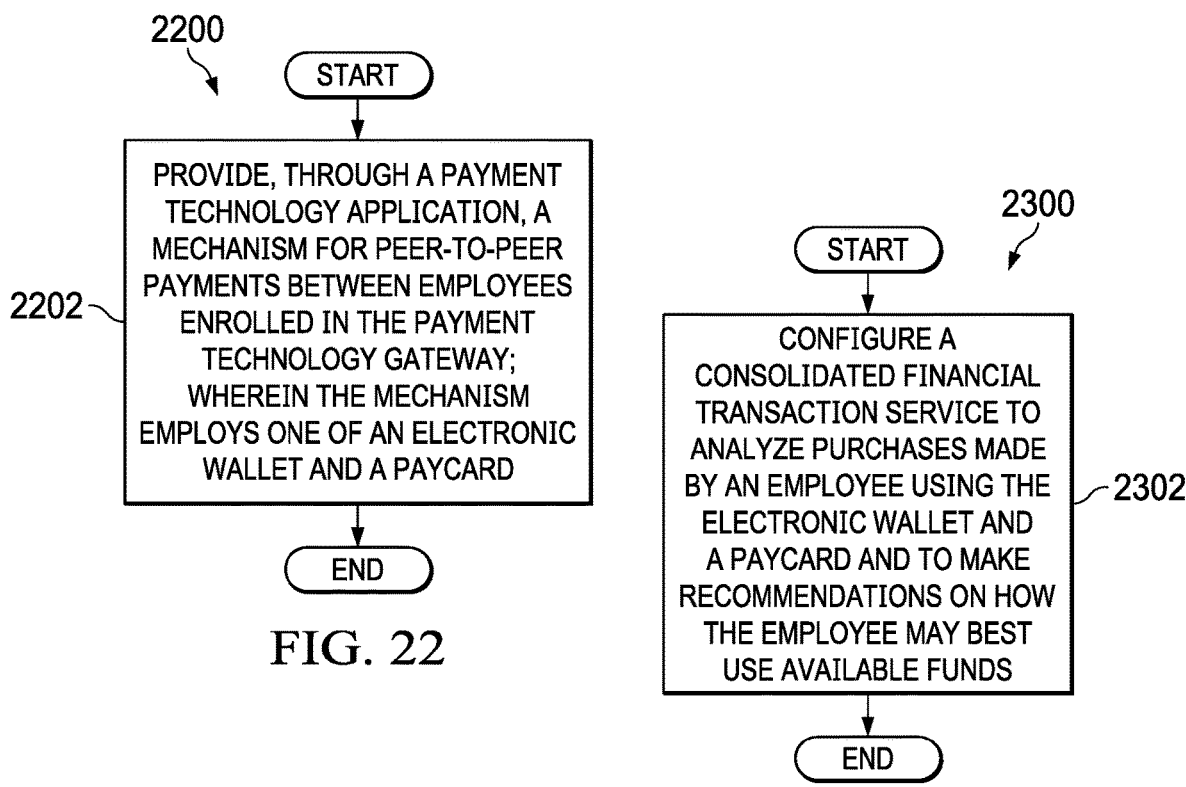
FIG. 22
FIG. 23

SINGLE PAYMENT VALIDATION GATEWAY

BACKGROUND INFORMATION

1. Field

The present disclosure relates generally to an improved computer system and, in particular, to a method and apparatus for consolidating financial transactions of an employee in a payment technology gateway. Still more particularly, the present disclosure relates to a method and apparatus for a payment technology gateway validated by a single payment number.

2. Background

The focus on technology in financial transactions grows rapidly. One effect is that the amount of accounts and cards, such as credit or debit cards, increases steadily just to meet a status quo. Many attempts have been made in solving the problem of consolidating the multiple accounts and cards. Major information system companies such as Apple® and Google® have provided payment systems using mobile phones. However, current systems require adoption of new, sophisticated, and expensive equipment in order to validate purchases. A need exists for a technical solution, for a single payment system validated by a single payment number that is compatible with existing platforms and current commercial systems.

Therefore, it would be desirable to have a method and apparatus that take into account at least some of the issues discussed above, as well as other possible issues. For example, it would be desirable to have a method and apparatus that overcame the problem of requiring new, sophisticated, and expensive equipment in order to validate purchases using a single payment system and a single payment number.

SUMMARY

An embodiment of the present disclosure provides a method for consolidating financial transactions of an employee in a payment technology gateway. The computer-implemented method comprises establishing, by an employer's data processing system, the payment technology gateway having a payment technology application. An electronic wallet application linked to the payment technology application is provided. A paycard linked to the payment technology application is provided. The payment technology gateway is configured to be a single gateway through which the employee conducts financial transactions on a number of accounts using the electronic wallet and the paycard. Each financial transaction is validated by the payment technology gateway using a single payment number.

Another embodiment of the present disclosure provides a system for consolidating financial transactions of an employee in a payment technology gateway. The system comprises: a data processing system connected to a network, a number of internal databases, and a number of external data sources; a payment technology gateway running on a processor unit of the data processing system and connected to a network. Computer program instructions, stored in a computer-readable storage medium of the data processing system, are configured to cause the processor unit to display a wallet display for an electronic wallet. In response to entry by the employee on the wallet display of a number of credit cards, issued to the employee by a number of credit card providers, the electronic wallet is linked to each of the number of credit cards issued to the employee so that a charge incurred using an active card will be passed through to one of the credit cards by the payment technology application in accordance with a selection of the one of the credit cards by the employee as the active card. The employee selects the active card by touching or swiping a wallet display on the portable device. The wallet display enables management of transactions on a number of accounts. The number of accounts comprises credit card accounts, bank accounts, personal identification, insurance accounts, mortgage accounts, FSH accounts and HSA accounts. The wallet display is downloadable to a portable device by one of an internet connection and a wireless connection. Each financial transaction is validated by the payment technology gateway using a single payment number.

Yet another embodiment of the present disclosure provides a computer program product for consolidating financial transactions of an employee in a payment technology gateway. The computer program product comprises computer program instructions stored in a computer-readable storage medium of the data processing system are configured to cause the processor unit, responsive to entry by the employee on the wallet display of a number of credit cards, issued to the employee by a number of credit card providers, to link the electronic wallet to each of the number of credit cards issued to the employee so that a charge incurred using an active card will be passed through to one of the credit cards by the payment technology application in accordance with a selection of the one of the credit cards by the employee as the active card. Computer program instructions stored in a computer-readable storage medium of the data processing system are configured to cause the processor unit to enable the employee to select the active card by touching or swiping a wallet display on the portable device. Computer program instructions stored in a computer-readable storage medium of the data processing system are configured to cause the processor unit to validate each financial transaction by the payment technology gateway using a single payment number.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 21 is a flowchart of a process for providing a team reward application on an electronic wallet in accordance with an illustrative embodiment;

FIG. 22 is a flowchart of a process for providing peer-to-peer payments between employees enrolled in the payment technology gateway in accordance with an illustrative embodiment;

FIG. 23 is a flowchart of a process for analyzing purchases made by the employee using the electronic wallet and the paycard in accordance with an illustrative embodiment.

DETAILED DESCRIPTION

Figure 1:
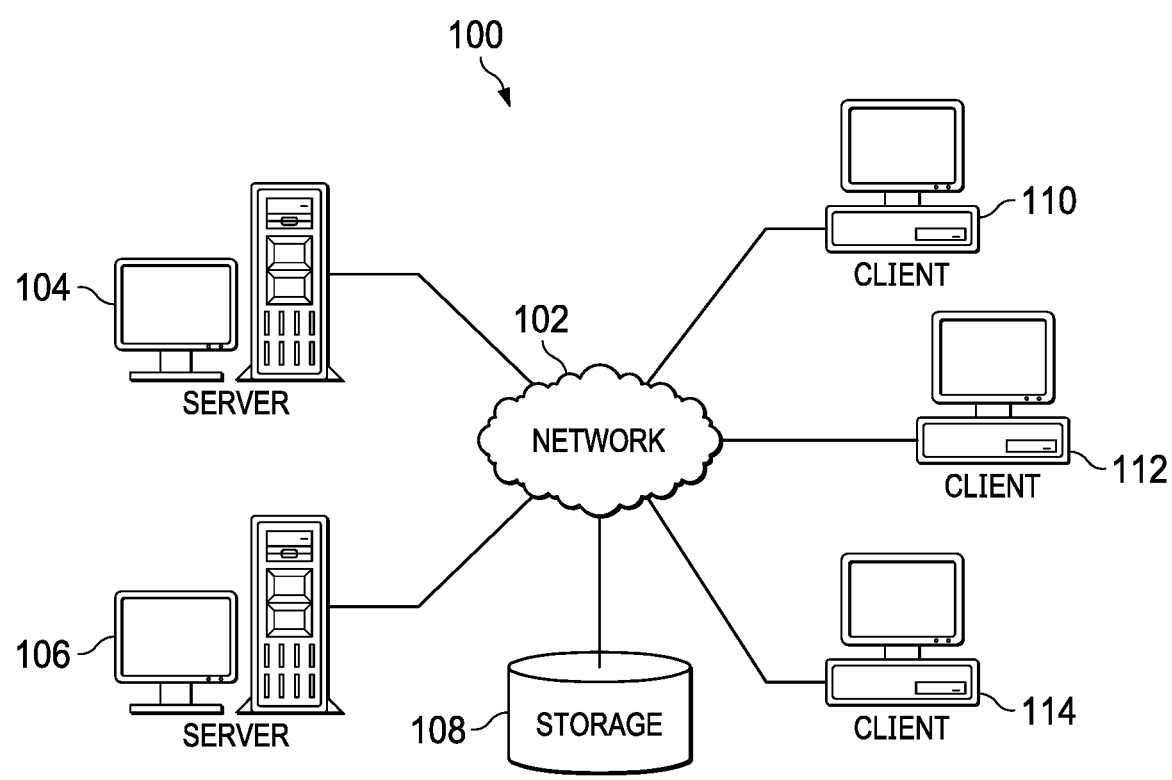
FIG. 1 is a diagram of an information environment in accordance with an illustrative embodiment.

The illustrative embodiments recognize and take into account one or more different considerations. For example, the illustrative embodiments recognize and take into account a number of different bank accounts from different banks or brokerage accounts that an employee may have to use in financial transactions. Moreover, the illustrative embodiments recognize and take into account a number of different debit cards from the different banks that the employee may have to use in the financial transactions.

The illustrative embodiments further recognize and take into account a number of different credit cards from different service providers that the employee may have to use in the financial transactions. The illustrative embodiments recognize and take into account a number of statements that the employee may have to read, check, and manage for the number of different bank accounts, brokerage accounts, and credit card service providers.

The illustrative embodiments recognize and take into account that there have been many attempts to consolidate financial transactions. For example, Apple® and Google® have provided payment systems that consolidate at least some transactions. The illustrative embodiments recognize and take into account that the payment systems provided by Apple® and Google® require a vendor to adopt new, sophisticated, and expensive equipment in order to validate purchases. Therefore, only some vendors offer these types of payment systems that consolidate some transactions.

The illustrative embodiments recognize and take into account that a need exists for a system that validates all purchases. The illustrative embodiments recognize and take into account that a system that validates all purchases may use an electronic wallet or a single paycard. Moreover, the illustrative embodiments recognize and take into account that a system that makes purchases using an electronic wallet or single paycard must also route the purchases from the electronic wallet or the single paycard in a manner that allows payment without a requirement for additional equipment at a vendor location. The illustrative embodiments recognize and take into account that such a payment system may allow a user to route the purchases from the electronic wallet or the single paycard to an existing platform and current commercial system.

The illustrative embodiments recognize and take into account that an electronic wallet and single paycard may have a single payment number for transactions. The illustrative embodiments recognize and take into account that a single payment number for transactions may be tied to a payment technology gateway. The payment technology gateway may provide a display for touchscreen input or swiping input. A transaction may be performed using the single payment number by the electronic wallet or the single paycard, and the transaction may be routed to a specific account previously designated by the user. In an illustrative example, a person having the electronic wallet or the single paycard may go to a grocery store and use the electronic wallet or the single paycard at the register to pay for purchases. At the register, the person may display a number of credit cards on the electronic wallet. The person may swipe the image of the card they select to use for the purchases, and the electronic wallet will complete the purchase using the single payment number and route the transaction to a selected card account. Alternatively, the person may use the single paycard to pay for the purchases and the transaction will be routed to a card chosen in advance by the user. Such a choice may be based on a policy defined by the user such as use of a particular card for a particular type of purchase.

The illustrative embodiments recognize and take into account that a payment technology gateway that provides an electronic wallet and single paycard may analyze purchases and make recommendations on how best to use funds available to the user. Furthermore, the illustrative embodiments recognize and take into account that machine intelligence may be employed to analyze the purchases and make recommendations on how best to use the funds available to the user.

The illustrative embodiments recognize and take into account that an electronic wallet, in addition to a number of credit cards, may include identification cards and insurance cards. The electronic wallet may show, responsive to selection of an identification card or an insurance card, additional details and actions related to the respective identification card and insurance card.

The illustrative embodiments recognize and take into account that an electronic wallet containing identification may be used as a scan card for entry to a workplace or a facility requiring identification to enter or otherwise to be granted access. In an illustrative example, the electronic wallet displaying the identification may be used to clock in and clock out of a workplace. The illustrative embodiments recognize and take into account that an electronic wallet containing insurance cards may be used as access cards for multiple family members and be configured for presentation at care facilities and doctor offices. Thus, a method and apparatus that would allow for a payment technology gateway validated by a single payment number would fill a long-felt need in the field of consolidating financial transactions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Thus, in one illustrative embodiment, one or more technical solutions are present that overcome a technical problem in the area of consolidating financial transactions. A method, computer system, and computer program product for consolidating financial transactions of an employee in a payment technology gateway is provided. The payment technology gateway comprises an electronic wallet linked to a payment technology application and a paycard linked to the payment technology application. The payment technology gateway is configured to be a single gateway through which the employee conducts financial transactions on a number of accounts using the electronic wallet and the paycard. Each financial transaction is validated by the payment technology gateway using a single payment number. Thus, one or more technical solutions may provide a technical effect of processing transactions more efficiently and conveniently for a user.

Moreover, machine intelligence can be used to analyze and make recommendations to an employee in regard to ways to better utilize funds available to the employee. All of a user's transactions can be conducted at a single gateway and thus a user's entire financial transaction history can be used in analyzing and providing recommendations to the user. Moreover, the electronic wallet and paycard may be used as identification for access and for clocking in and clocking out by employees. Therefore, increased speed and accuracy in authenticating employees and tracking employee time for payroll may be achieved. The increased speed and accuracy may be reflected in reduced process time and reduced memory and storage usage. Reduced processor time may be for processor unit 2404 in FIG. 24. Reduced memory and storage may be for memory 2406 and persistent storage 2408 in FIG. 24.

With reference now to the figures and, in particular, with reference to FIG. 1, a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, programmable apparatus, or other device to produce a computer-implemented process, such that the instructions which execute on the computer, programmable apparatus, or other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
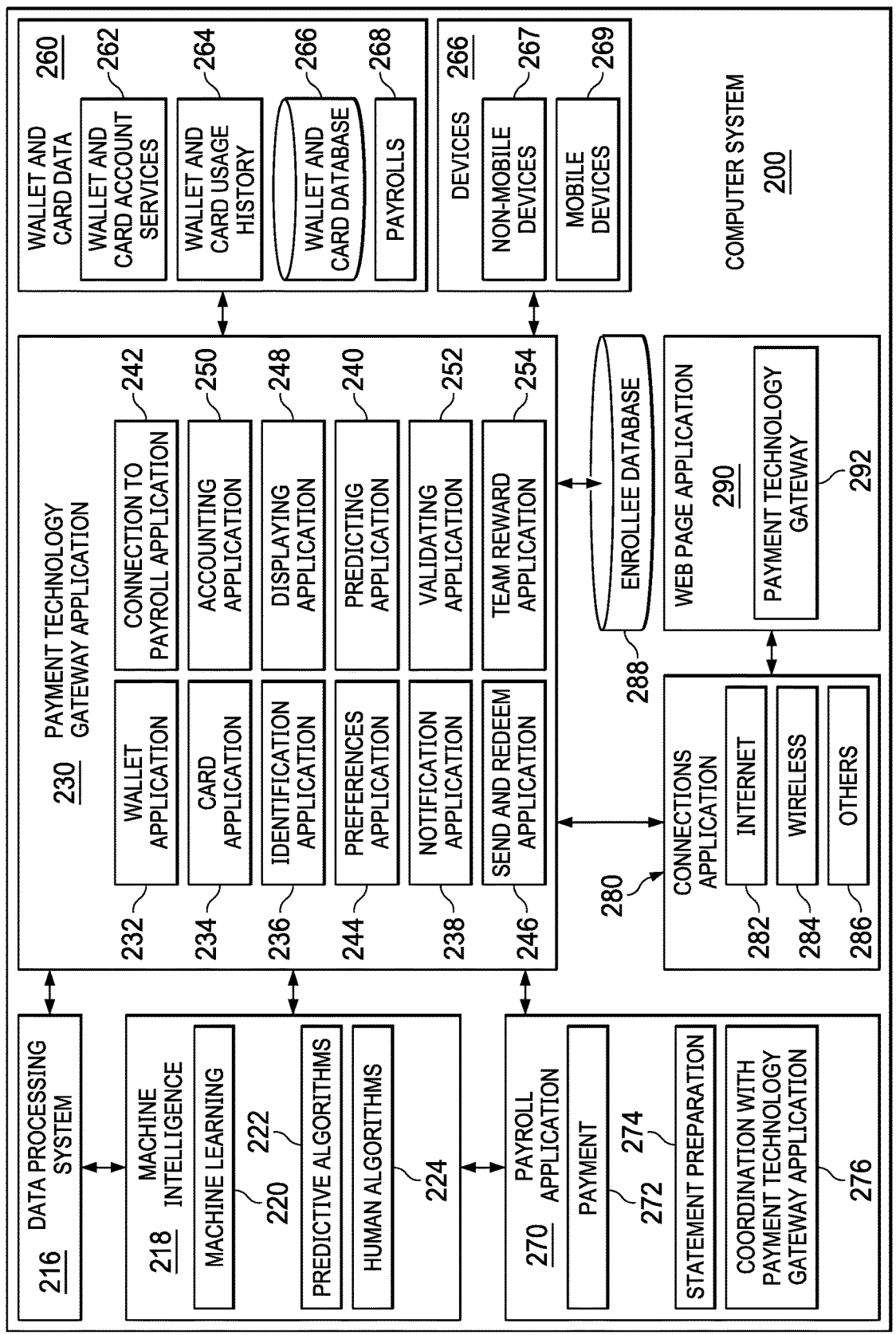
FIG. 2 is a block diagram of a computer system for consolidating financial transactions of an employee in a payment technology gateway in accordance with an illustrative embodiment.

Turning to FIG. 2, a block diagram of a computer system for consolidating financial transactions of an employee in a payment technology gateway is depicted in accordance with an illustrative embodiment. Computer system 200 comprises data processing system 216 connected to a number of applications, databases, and devices. The number of applications comprises machine intelligence 218, payroll application 270, payment technology gateway application 230, connections application 280, and web page application 290. Databases comprise wallet and card database 266 and enrollee database 288. Devices 266 may comprise non-mobile devices 267 and mobile devices 269.

Figure 24:
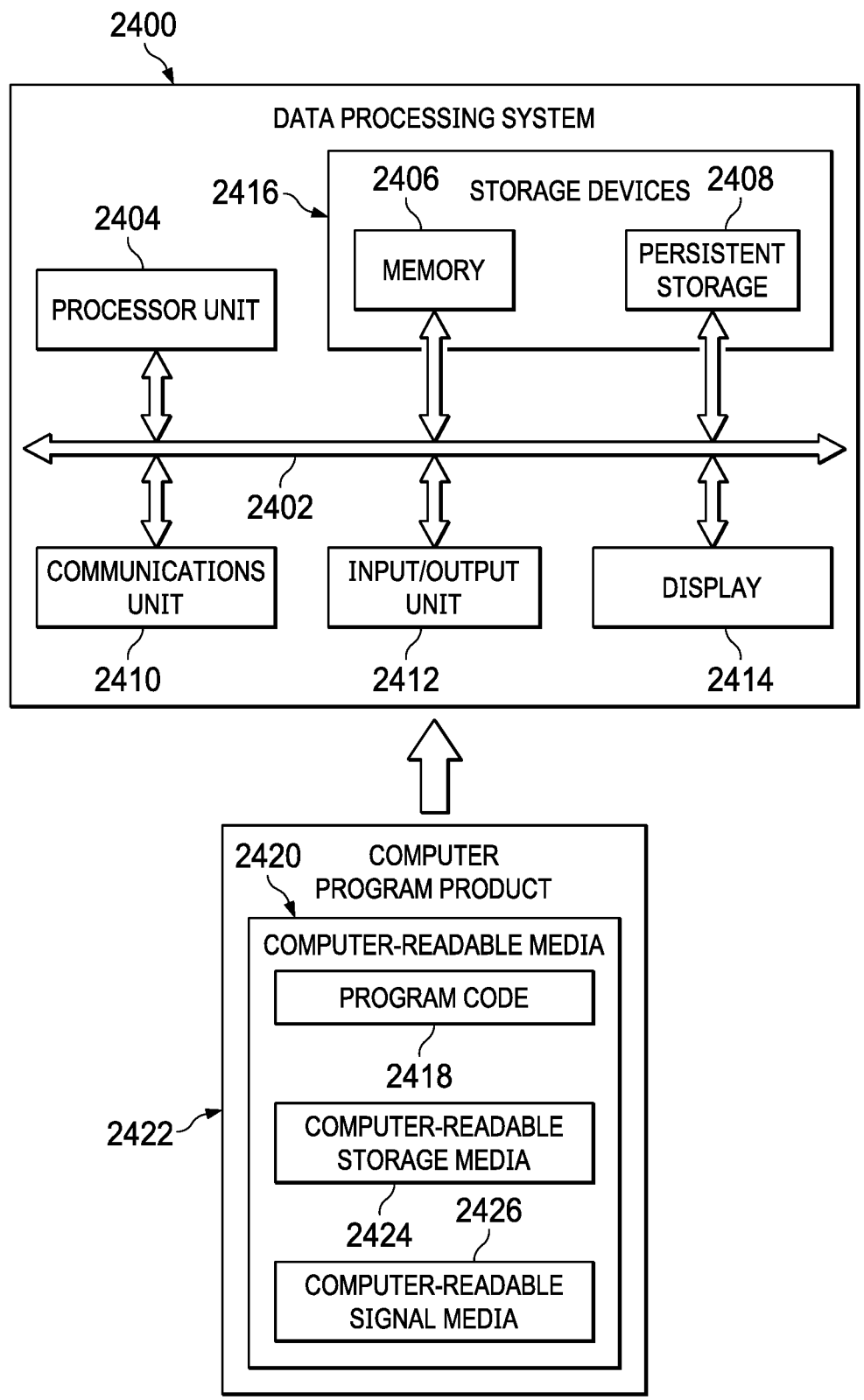
FIG. 24 is a block diagram of a data processing system in accordance with an illustrative embodiment.

Data processing system 216 may be data processing system 2400 depicted in FIG. 24. Machine intelligence 218 comprises machine learning 220, predictive algorithms 222, and human algorithms 224. Machine intelligence 218 can be implemented using one or more systems such as an artificial intelligence system, an neural network, a Bayesian network, an expert system, a fuzzy logic system, a genetic algorithm, or other suitable types of systems. Machine intelligence 218 may work in conjunction with predicting application 240, accounting application 250, and preferences application 244 in payment technology gateway application 230. Machine intelligence 218 may be employed to analyze purchases and make recommendations on how best to use funds available to an employee using wallet and card account services 262.

Payroll application 270 comprises payment 272, statement preparation 274, and coordination with payment technology gateway application 276. Payroll application 270 may be used by an employer to process payroll for employees. In an embodiment, payroll application 270 may be connected to payment technology gateway application 230 by coordination with payment technology gateway application 276 in payroll application 270 and connection to payroll application 242 in payment technology gateway application 230. In an illustrative embodiment, payments made by payment technology gateway application 230 may be deducted from payment 272 and reflected in statement preparation 274 of payroll application 270.

Payment technology gateway application 230 comprises wallet application 232, card application 234, identification application 236, notification application 238, preferences application 244, send and redeem application 246, connection to payroll application 242, accounting application 250, displaying application 248, predicting application 240, team reward application 254, and validating application 252. Wallet application 232 may provide an electronic wallet such as electronic wallet 604 in FIG. 6, electronic wallet 702 in FIG. 7, electronic wallet 814 in FIG. 8, electronic wallet 902 in FIG. 9, electronic wallet 1002 in FIG. 10, electronic wallet 1102 in FIG. 11, electronic wallet 1202 in FIG. 12, and electronic wallet 1302 in FIG. 13. Moreover, wallet application 232 may comprise processes such as process 1400 in FIG. 14, process 1500 in FIG. 15, process 1600 in FIG. 16, and process 1700 in FIG. 17.

Figure 8:
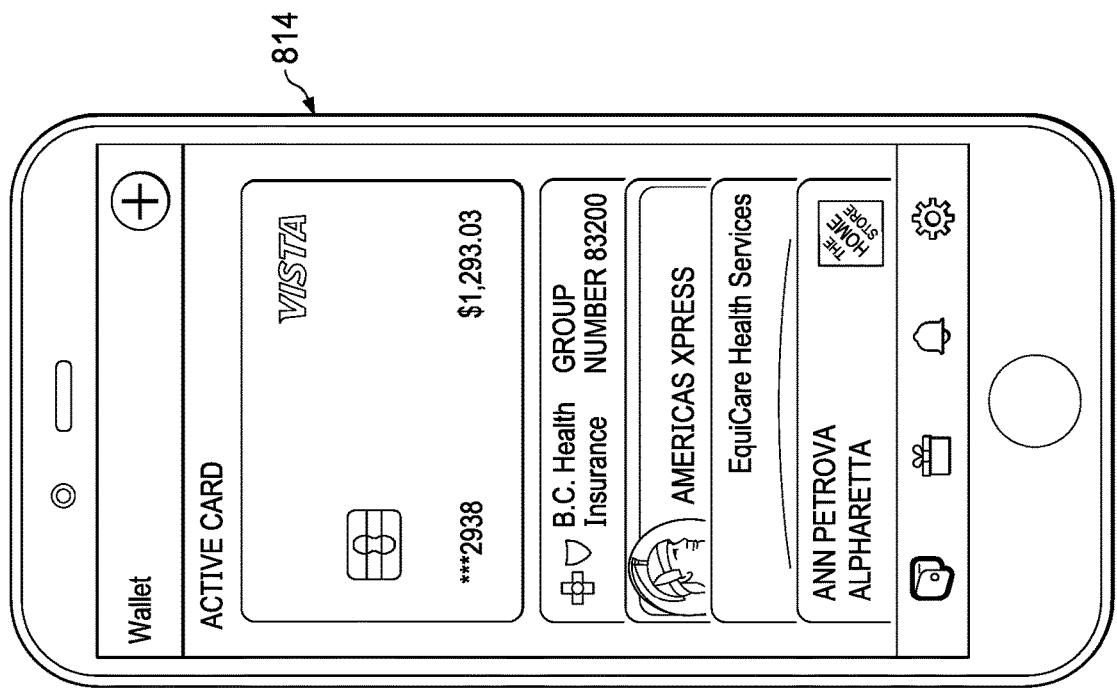
FIG. 8 is an illustration of a paycard with identification, a paycard, and an electronic wallet in accordance with an illustrative embodiment.
Figure 8:
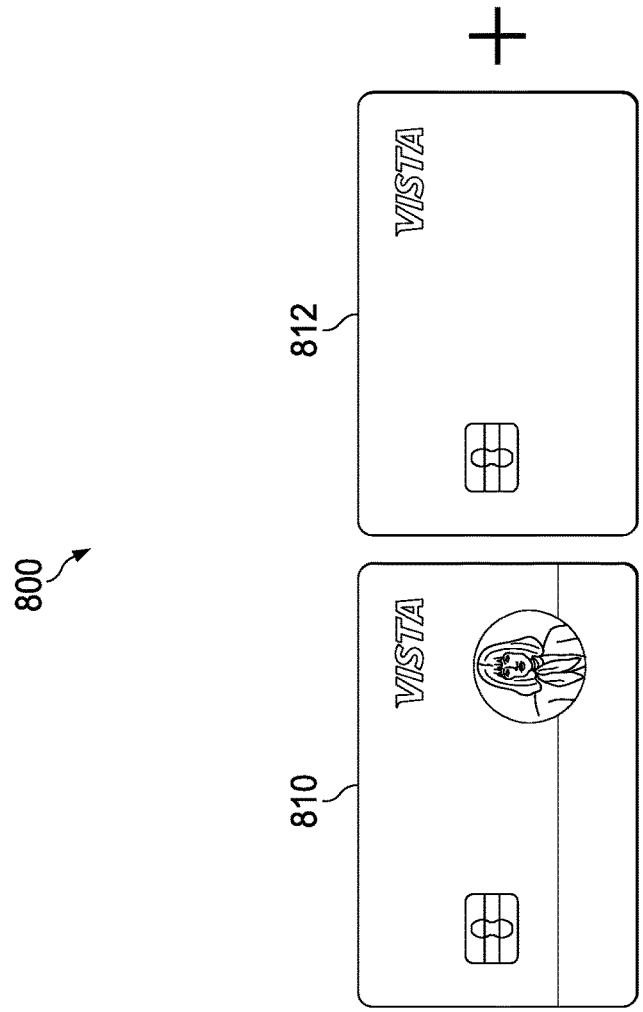
Figure 9:
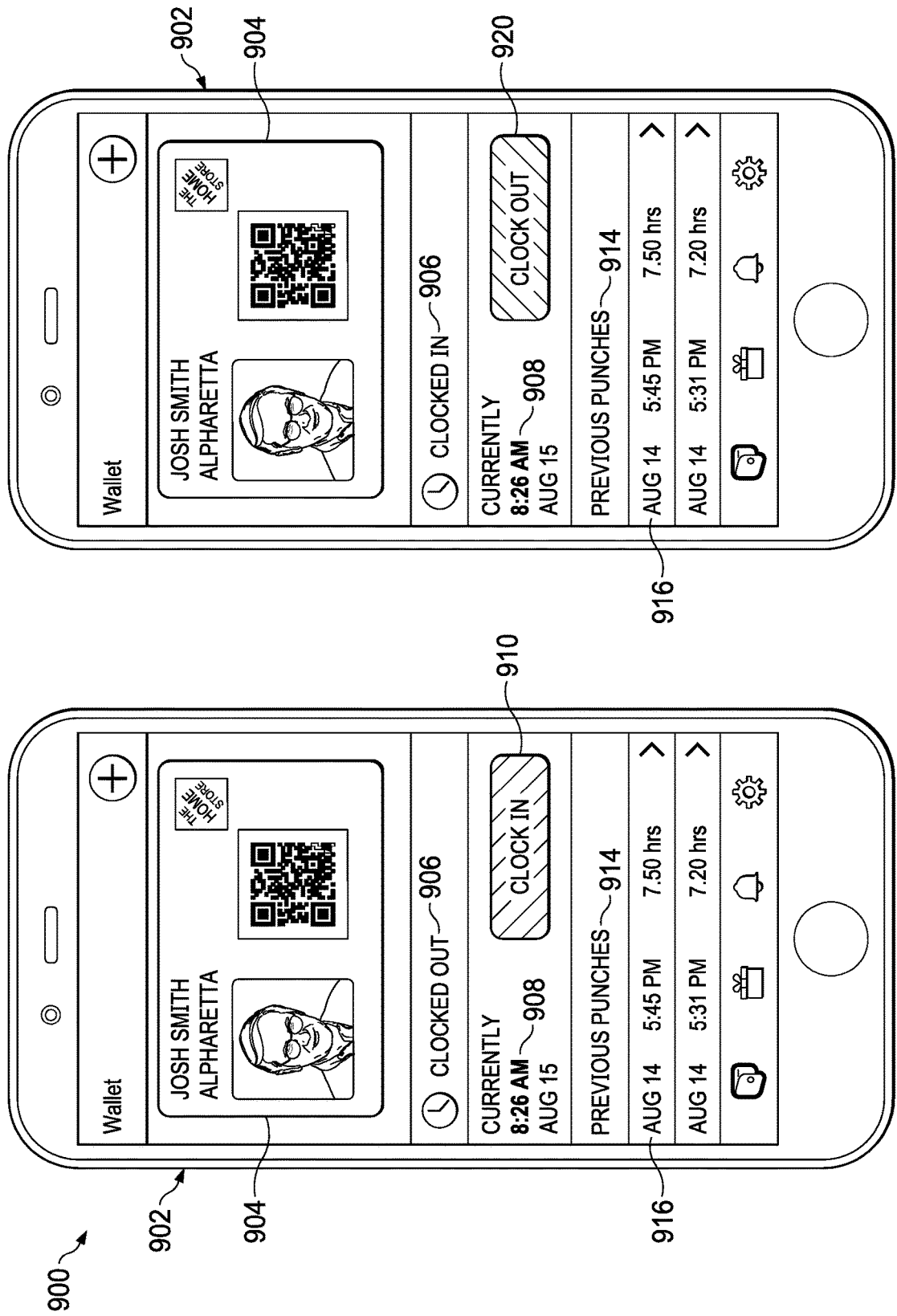
FIG. 9 is an illustration of an electronic wallet with an identification display showing a clock-in and clock-out function in accordance with an illustrative embodiment.
Figure 18:
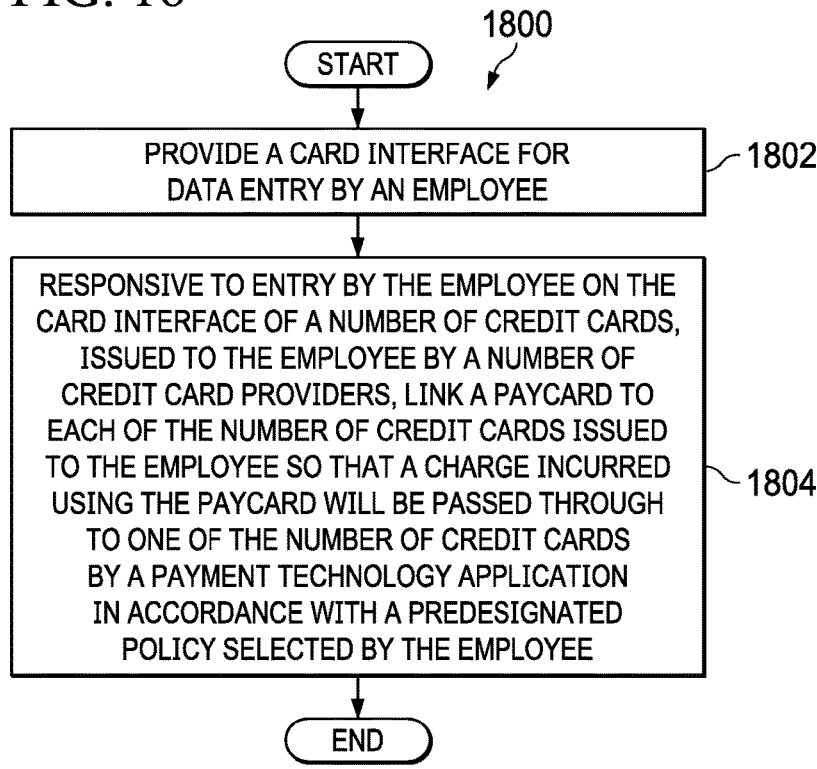
FIG. 18 is a flowchart of a process for using a card interface to link a number of cards to a paycard in accordance with an illustrative embodiment.
Figure 19:
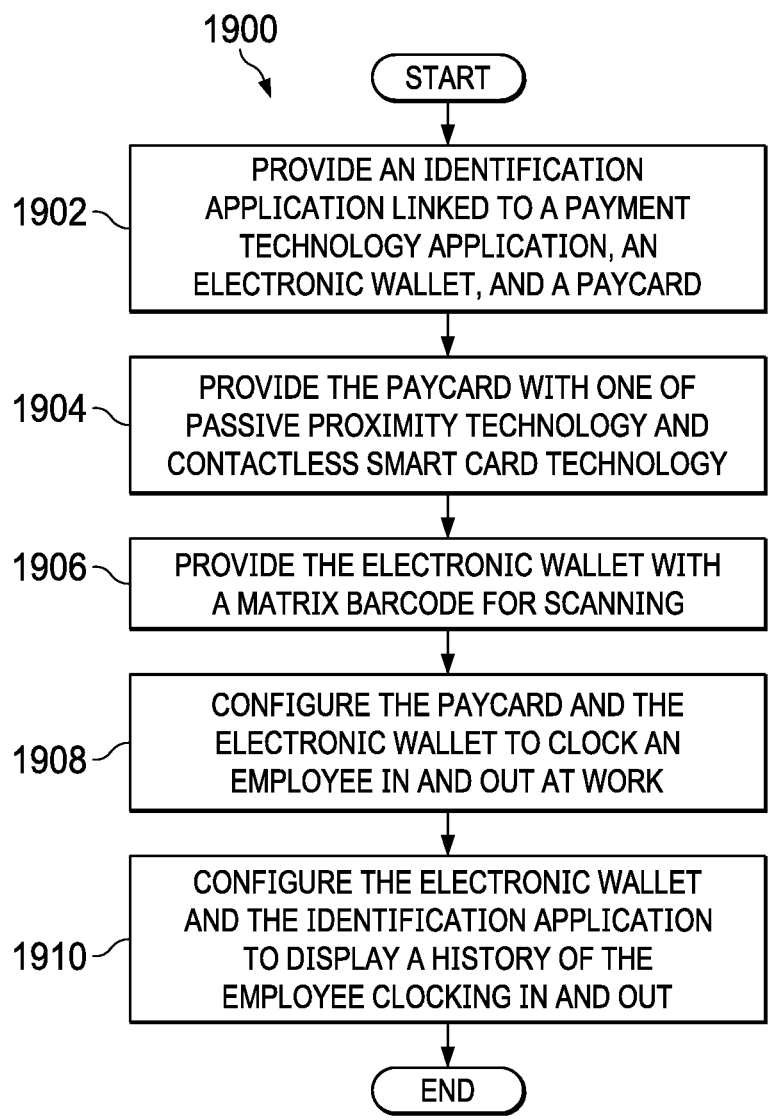
FIG. 19 is a flowchart of a process for enabling an electronic wallet as an identification card in accordance with an illustrative embodiment.

Identification application 236 may provide identification and signing in and signing out capabilities as shown in electronic wallet 902 in FIG. 9 and comprise processes such as process 1900 in FIG. 19. Preferences application 244 may provide preferences as depicted in electronic wallet 1002 in FIG. 10 and comprise processes such as process 2000 in FIG. 20. Send and redeem application 246 may provide a display such as gift display 1202 and redeem display 1239 in FIG. 12. Send and redeem application 246 may comprise a process such as process 2000 in FIG. 20. Team reward application 250 may provide a display such as display 1306 in FIG. 13. Team reward application may comprise a process such as process 2100 in FIG. 21. Accounting application 250 may provide support for process 1500 in FIG. 15. Displaying application 248 may provide support for wallet application 232 in FIGS. 6-13. Predicting application 240 may provide recommendations on spending in conjunction with one or both of accounting application 250 and machine intelligence 218. Validating application 252 enables the process of step 1408 in FIG. 14 and step 1804 in FIG. 18 so that each financial transaction is validated by payment technology gateway application 230 using a single payment number. In an embodiment, the single payment number is a number assigned to a paycard by a financial services provider that issues credit cards and that is selected by the employer to provide the paycard.

Connections application 280 comprises Internet 282, wireless 284, and others 286. Internet 282 provides connectivity between payment technology gateway 292, data processing system 216, and payment technology gateway application 230. Web page application 290 provides payment technology gateway 292. Payment technology gateway 292 may be configured as an interface between an employee and payment technology gateway application 230.

Wallet and card data 260 comprises wallet and card account services 262, wallet and card usage history 264, wallet and card database 266, and payrolls 268. Wallet and card database 266 may further comprise wallet and card database 400 in FIG. 4.

Computer system 200 may use one or more programs such as machine intelligence 218, payroll application 270, payment technology gateway application 230, connections application 280, and web page application 290 in conjunction with wallet and card database 266 and enrollee database 288 in order to consolidate financial transactions of an employee in a payment technology gateway such as payment technology gateway 292. As a result, computer system 200 operates as a special purpose computer system for providing an electronic wallet and a single paycard to consolidate financial transactions of an employee in a payment technology gateway. Thus, payment technology application 230 transforms computer system 200 into a special purpose computer system as compared to currently available general computer systems that do not have a means to consolidate financial transactions such as computer system 200 of FIG. 2 and as further described in FIGS. 3-23.

Moreover, currently used general computer systems do not provide a data processing system such as data processing system 216 configured by payment technology gateway application 230 in communication with databases such as wallet and card database 266 and enrollee database 288 to provide consolidated financial transactions as further described in FIGS. 3-23. Moreover, currently used general computer systems do not provide connectivity between a single electronic wallet and a single paycard with a payment technology gateway such as payment technology gateway 292.

Figure 3:
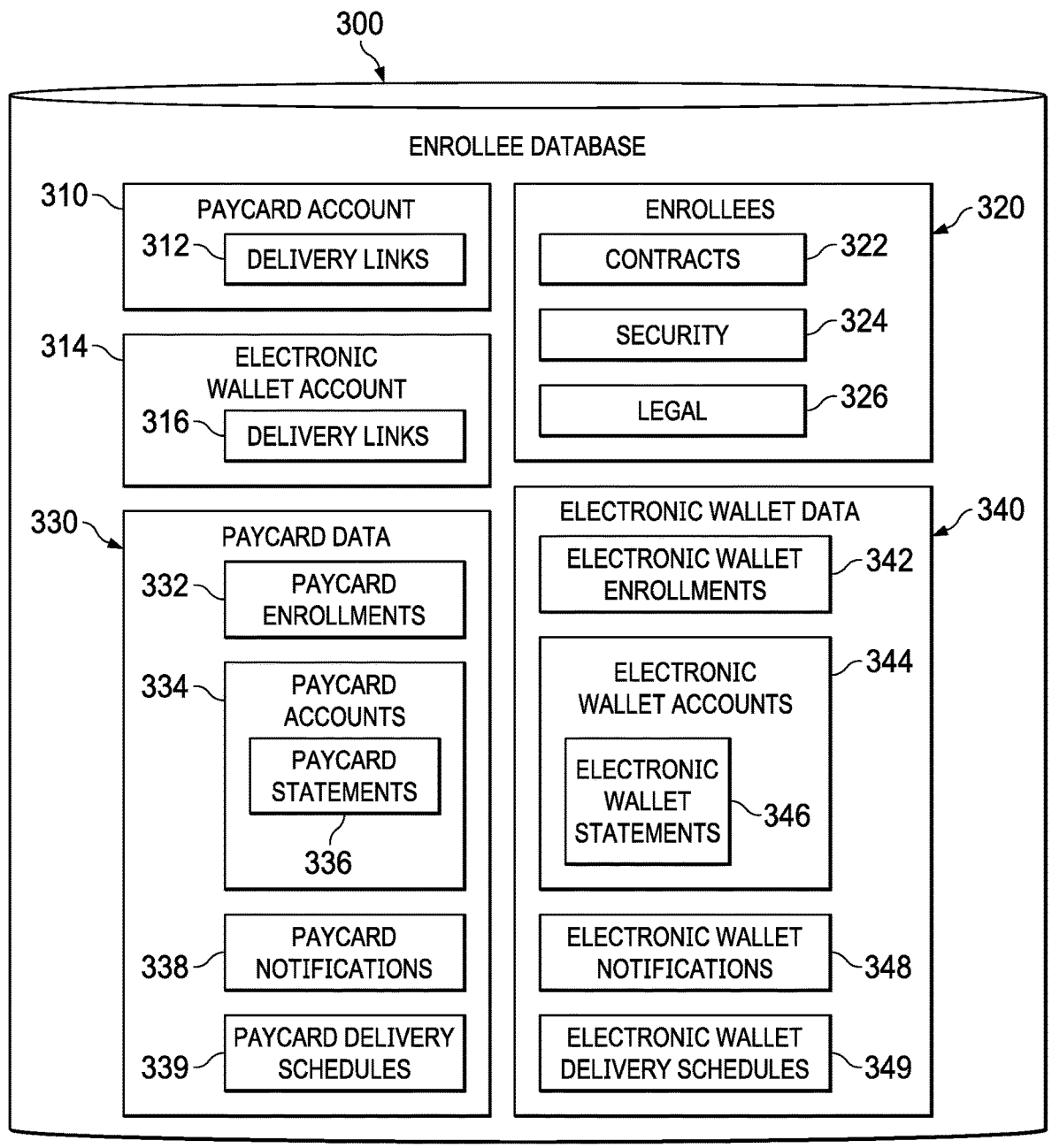
FIG. 3 is an block diagram of an enrollee database in accordance with an illustrative embodiment.

Turning to FIG. 3, a block diagram of an enrollee database is depicted in accordance with an illustrative embodiment. Enrollee database 300 may be enrollee database 288 in FIG. 2. Enrollee database 300 may comprise paycard account 310, electronic wallet account 314, enrollees 320, paycard data 330, and electronic wallet data 340. Paycard account 310 may comprise delivery links 312. Electronic wallet account 314 may comprise delivery links 316. Enrollees 320 may comprise contracts 322, security 324, and legal 326. Paycard data 330 may comprise paycard enrollments 332, paycard accounts 334, paycard notifications 338, and paycard delivery schedules 339. Paycard accounts 334 may further comprise paycard statements 336. Electronic wallet data 340 may comprise electronic wallet enrollments 342, electronic wallet accounts 344, electronic wallet notifications 348, and electronic wallet delivery schedules 349. Electronic wallet accounts 344 may further comprise electronic wallet statements 346.

Figure 4:
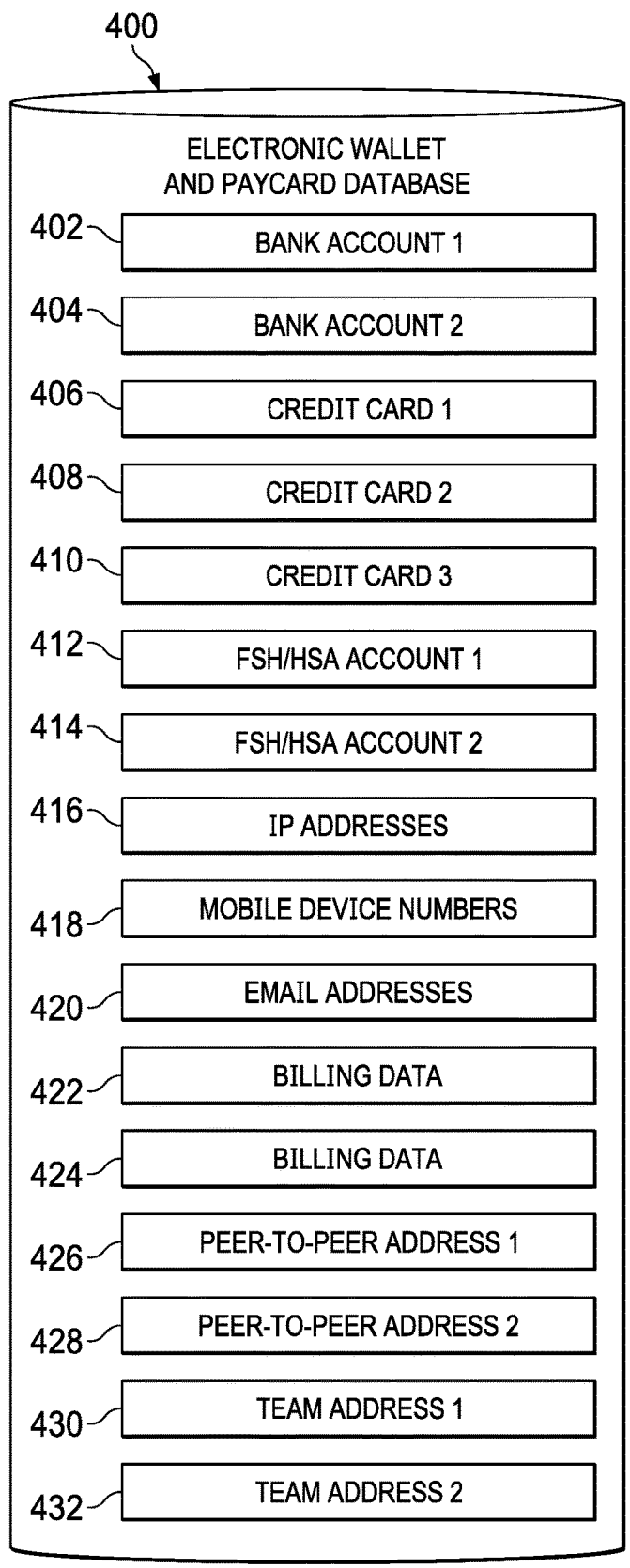
FIG. 4 is an block diagram of an electronic wallet and paycard database in accordance with an illustrative embodiment.

Turning to FIG. 4, a block diagram of an electronic wallet and paycard database is depicted in accordance with an illustrative embodiment. Electronic wallet and paycard database 400 may comprise bank account 1 402, bank account 2 404, credit card 1 406, credit card 2 408, credit card 3 410, FSH/HSA account 1 412, FSH/HSA account 414, internet protocol (IP) addresses 416, mobile device numbers 418, email addresses 420, billing data 1 422, billing data 2 424, peer-to-peer address 1 426, peer-to-peer address 2 428, team address 1 430, and team address 432. In the illustrative example of electronic wallet and paycard database 400, a number of credit cards, accounts, and information is shown by way of example. Persons skilled in the art know and take into account that any number of credit cards, accounts, and different types of information may be stored in electronic wallet and paycard database 400.

Figure 5:
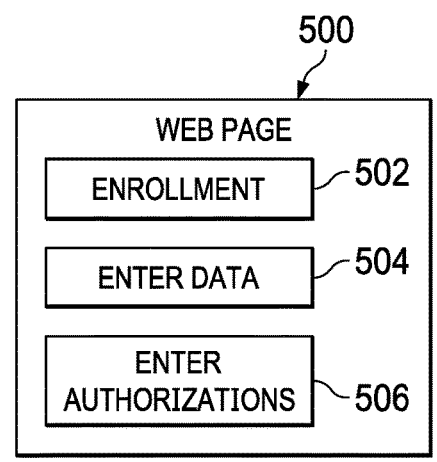
FIG. 5 is an block diagram of an interface with a payment technology gateway application in accordance with an illustrative embodiment.

Turning to FIG. 5, a block diagram of an interface with a payment technology gateway application is depicted in accordance with an illustrative embodiment. Web page 500 comprises enrollment 502, enter data 504, and enter authorizations 506. In the illustrative example of web page 500, a number of selections are depicted which would lead to additional pages with additions selections and entry icons. Web page 500 is presented by way of illustrative example. Persons skilled in the art recognize and take into account that web page 500 may be configured in any number of ways to support computer system 200 in FIG. 2.

Figure 6:
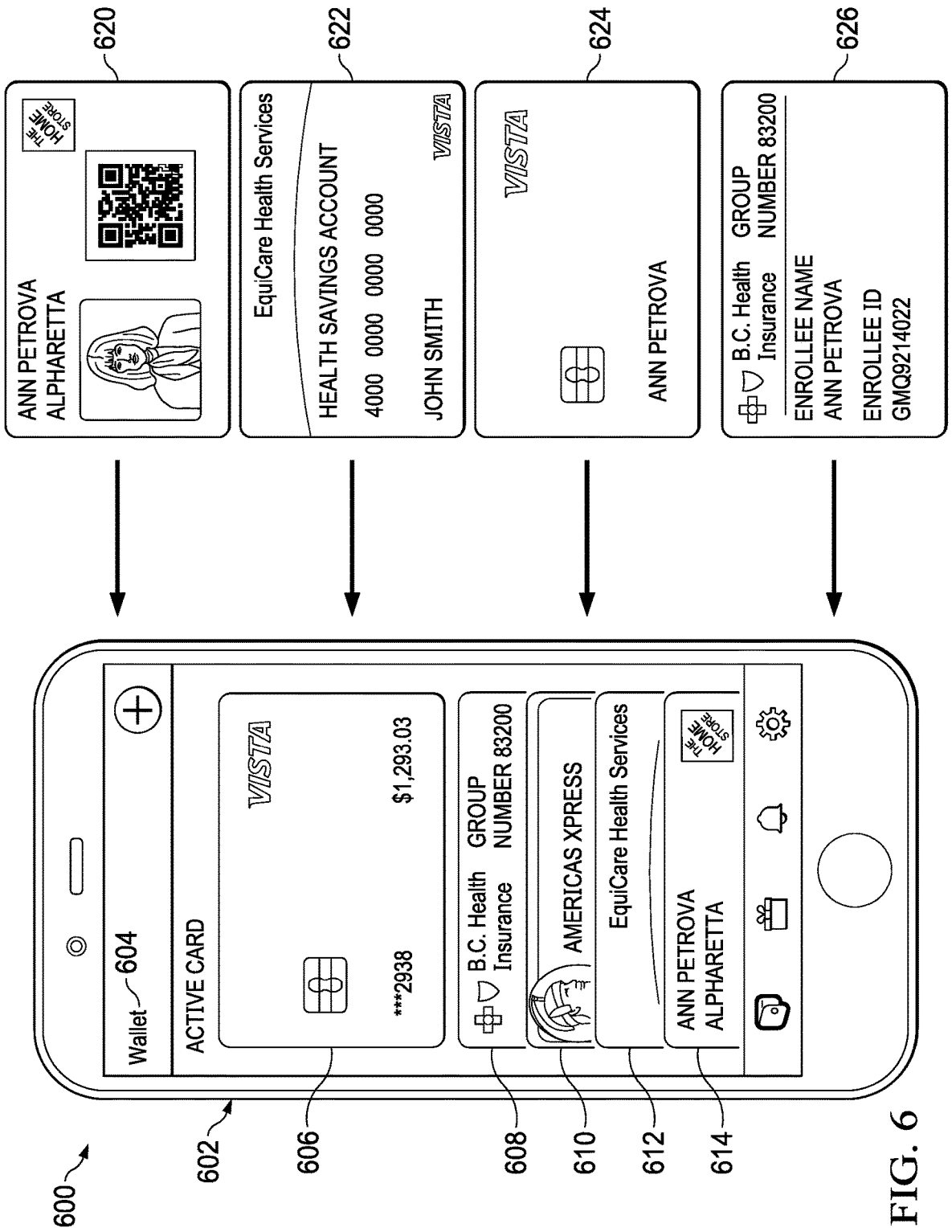
FIG. 6 is an illustration of a mobile device displaying an electronic wallet display in accordance with an illustrative embodiment.

Turning to FIG. 6, an illustration of a mobile device displaying an electronic wallet is depicted in accordance with an illustrative embodiment. Electronic wallet 600 comprises mobile device 602 and a number of cards such as identification cards, credit cards, or insurance cards. In an illustrative example, the number of cards may comprise identification card 620, health insurance card 622, paycard 624, and health insurance identification card 626. Electronic wallet display 604 shows a selected card and a number of partially disclosed cards representing cards pocketed in a wallet, and therefore, referred to as a pocketed card. A card may be selected as an active card by swiping one of the number of partially disclosed cards. In the illustrative example, health identification card 626 is shown as first pocketed card 608, a credit card is shown as second pocketed card 610, health insurance card 622 is shown as third pocketed card 612, and identification card 620 is shown as fourth pocketed card 614. Paycard 624 is shown as an active card above the pocketed cards. Active card 606 is ready for a transaction. Electronic wallet 600 may be configured by wallet application 232 of payment technology gateway 230 in FIG. 2. Electronic wallet 600 may be implemented by process 1400 in FIG. 14, process 1600 in FIG. 14, and process 1700 in FIG. 17.

Figure 7:
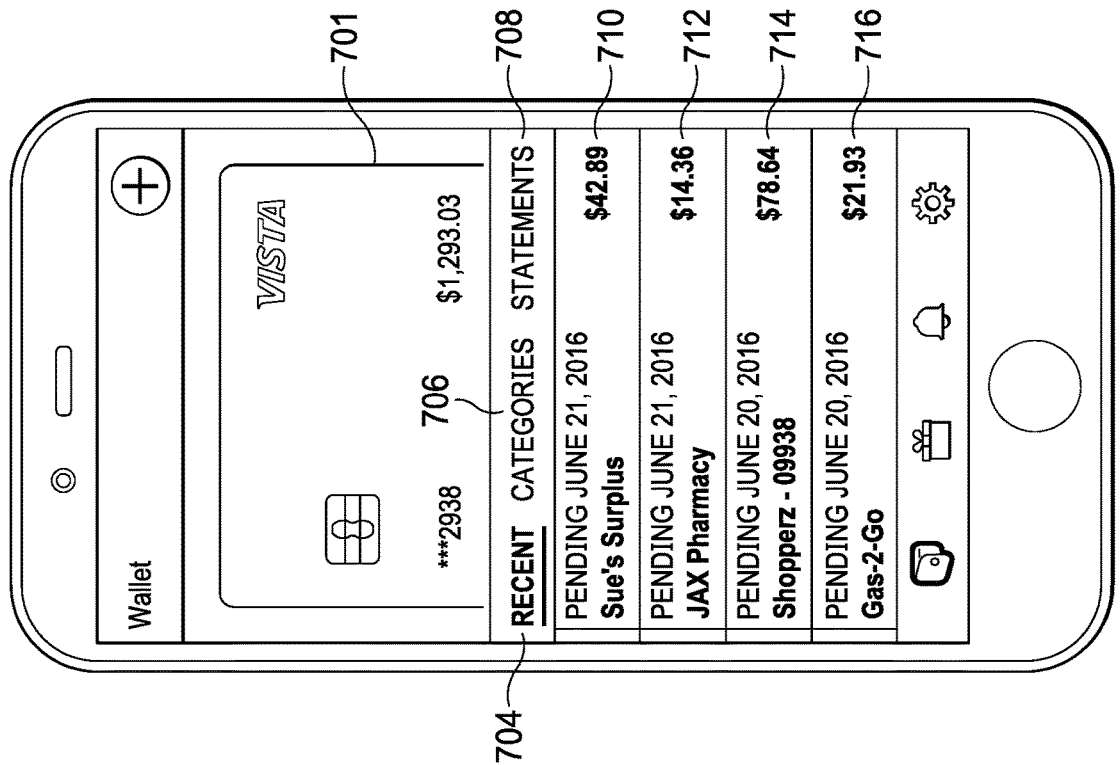
FIG. 7 is an illustration of an electronic wallet transaction display in accordance with an illustrative embodiment.

Turning to FIG. 7, an illustration of an electronic wallet transaction display is depicted in accordance with an illustrative embodiment. Electronic wallet 700 is depicted with an active card display. Mobile device 702 is shown on the left as depicted in FIG. 6. Mobile device 702 is shown on the right with a different wallet display. Wallet display 701 shows active card 606 in FIG. 6 along with a number of transactions. In the illustrative example, first transaction 710 is for $42.89, second transaction 712 is for $14.36, third transaction 714 is for $78.64, and fourth transaction 716 is for $21.93. Wallet display 701 provides for a selection of recent 704, categories 706, and statements 708. In the illustrative example, a user has selected recent 704 and recent transactions are displayed comprising first transaction 710, second transaction 712, third transaction 714, and fourth transaction 716. Selection of recent 704, categories 706, and statements 708 may be made by touching or swiping a selection in wallet display 701. Wallet display 701 may be configured by wallet application 232 in payment technology gateway 230 in FIG. 2. Wallet display 701 may be configured by process 1800 in FIG. 18.

Turning to FIG. 8, an illustration of a paycard with identification, a paycard, and an electronic wallet are depicted in accordance with an illustrative example. Electronic wallet 700 is shown with paycard and identification card 810. Paycard and identification card 810 represents a paycard that has passive proximity technology. Paycard and identification card 810 may be a paycard with contactless smart card technology with an EMV chip. Paycard 812 represents a paycard with an EMV chip only. Both cards may be pocketed in electronic wallet 814 for selection as an active card. In the illustrative example, paycard 812 has been selected as an active card in electronic wallet 814. Paycard 812 and paycard and identification card 810 may be configured by identification application 236 in payment technology gateway application 230 in FIG. 2. Paycard 812 may be configured by card application 234 in payment technology gateway application 230 in FIG. 2. Electronic wallet 814 may be configured by wallet application 232 in payment technology gateway application 230 in FIG. 2.

Turning to FIG. 9, an illustration of an application of an electronic wallet with identification for an employee clocking in and clocking out is depicted in accordance with an illustrative embodiment. Electronic wallet employee clock in and clock out system 900 comprises mobile device 902 displaying an electronic wallet display with identification card 904 selected as an active card. When identification card 904 is selected as an active card, electronic wallet employee clock in and clock out system 900 displays status 906, time 908, selector 910, history selection 914, and duration of last period 916. An employee clocks in by touching or swiping selector 910 which states "clock in". Immediately after swiping selector 910, status 906 changes from "clocked out" to "clocked in" and selector 910 now states "clock out". The foregoing changes are depicted on the right hand view of wallet display 902. The electronic wallet display with identification card 904 may be configured by process 1900 in FIG. 19.

Figure 10:
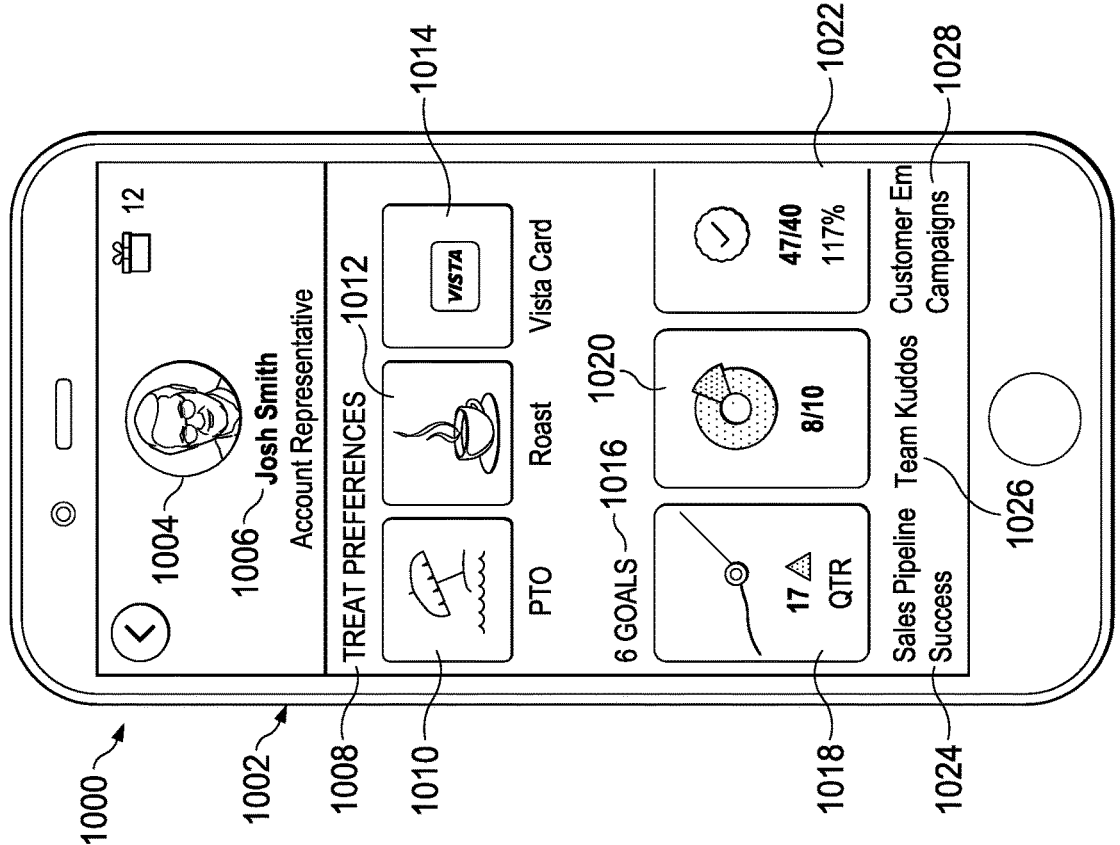
FIG. 10 is an illustration of a preference screen on a display of an electronic wallet in accordance with an illustrative embodiment.

Turning to FIG. 10, an illustration of a display screen for selecting preferences is depicted in accordance with an illustrative embodiment. Electronic wallet for selecting preferences 1000 is shown with mobile device 1002, employee picture 1004, name and position 1006, and a display offering selections of "treat preferences" 1008 and "goals" 1016. First treat preference 1010, second treat preference 1012, and third treat preference 1014 are shown. First treat preference 1010 may be time off. Second treat preference 1012 may be a coffee drink. Third treat preference 1014 may be a gift card. First goal 1018, second goal 1020, and third goal 1022 are shown. First goal 1018 may depict sales pipeline success 1024. Second goal 1020 may be "team kudos" 1026. Third goal 1022 may be customer campaigns 1028. Electronic wallet 1002 may be configured to select preferences by preferences application 244 of payment technology gateway application 230 in FIG. 2. Preferences application 244 may use process 1700 in FIG. 17. The display screen for selecting preferences in FIG. 10 is presented by way of illustrative example. Persons skilled in the art recognize and take into account that display screen for selecting preferences may show preferences or less preferences and may show different preferences.

Figure 11:
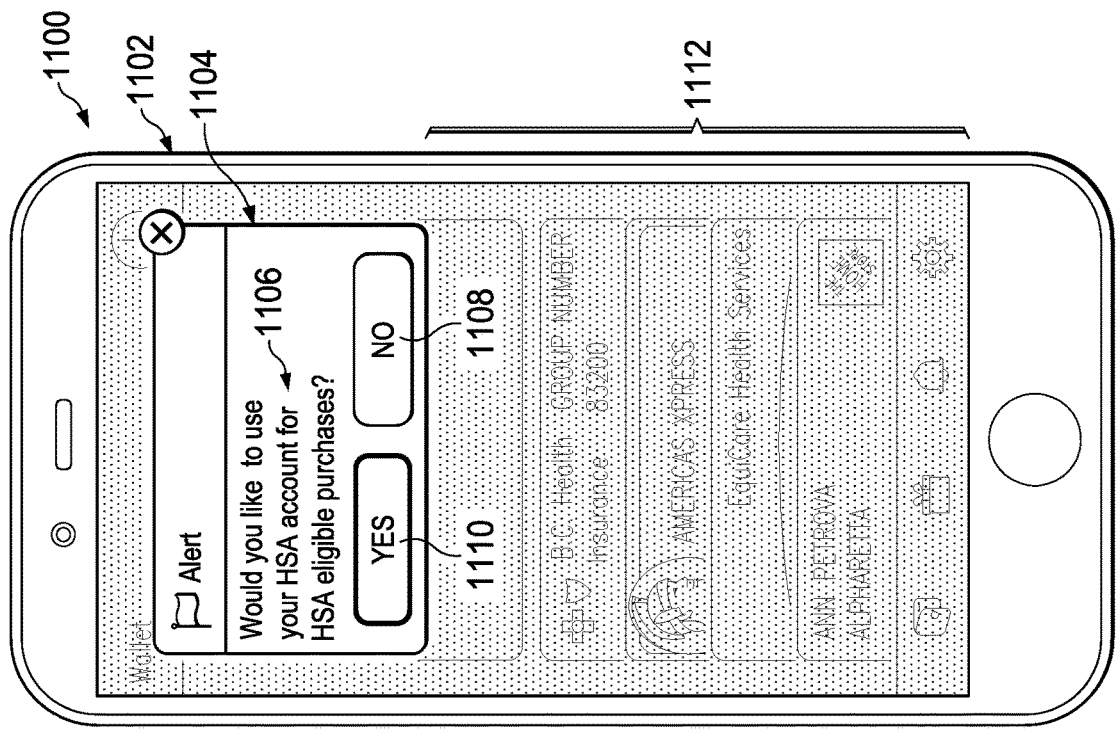
FIG. 11 is an illustration of an alert notification on a display of an electronic wallet in accordance with an illustrative embodiment.

Turning to FIG. 11, an illustration of an alert notification is depicted in accordance with an illustrative embodiment. Electronic wallet 1100 may have wallet display 1102 overshadowed by alert notification screen 1104. Alert notification screen 1104 may provide instant alerts on ways to save or how to better use accounts in mobile device 1102. In the illustrative example, a user may select "yes" 1110 or "no" 1108 by touching or swiping alert notification display 1104 in answer to the query caption "Would you like to use our HSA account for HSA eligible purchases?" 1106. Alert notification screen 1104 may be configured by notification application 238 in FIG. 2. Notification application 238 may employ process 1700 in FIG. 17.

Figure 12:
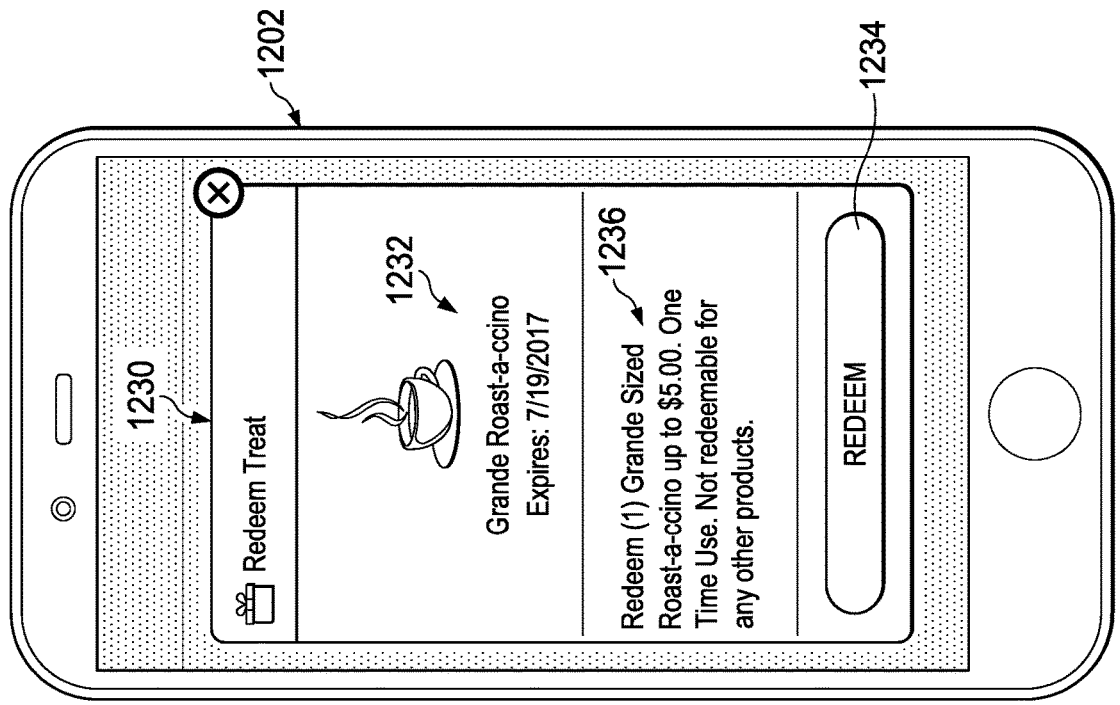
FIG. 12 is an illustration of send and redeem displays on an electronic wallet in accordance with an illustrative embodiment.
Figure 12:
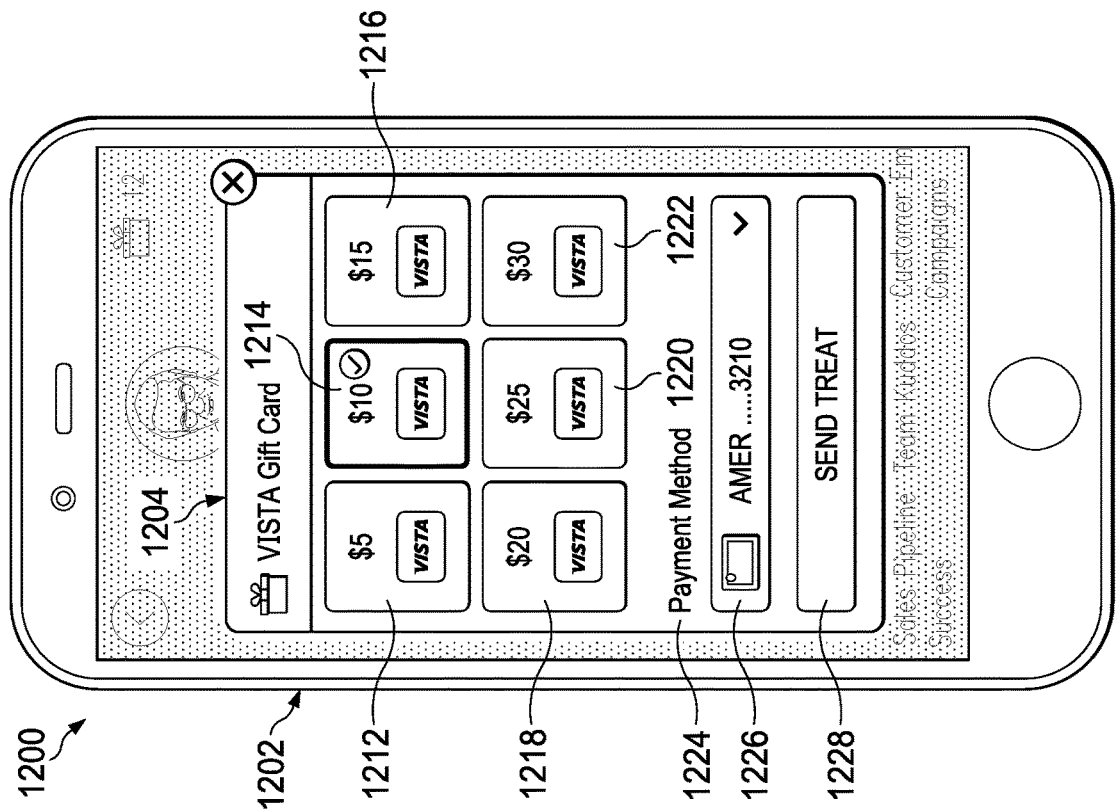

Turning to FIG. 12, an illustration of send and redeem screens in an electronic wallet are depicted in accordance with an illustrative embodiment. Electronic wallet 1200 has send screen 1204 in mobile device 1202 that allows a user to send digital treats or cash and to pay for the digital treat or cash using any card in the electronic wallet. In the illustrative example, a vista gift card has been chosen as a treat with an amount selected from first amount 1212, second amount 1214, third amount 1216, fourth amount 1218, fifth amount 1220, and sixth amount 1222. Once an amount is selected, a payment method may be selected in payment method portion of display 1224. In the illustrative example, payment method 1226 has been selected. The selected treat may be sent by touching or swiping "send treat" control 1228. Moreover, using beacon technology, electronic wallet 1202 may prompt a user and send a notification with a suggestion to redeem digital treats. Redeem treat display 1230 identifies treat 1232 and provides an expiration date and information 1236 regarding treat 1232. A recipient may redeem treat 1232 by touching or swiping "redeem" control 1234. Send screen 1204 and redeem treat display 1230 may be configured by send and redeem application 246 in payment technology gateway application 230 in FIG. 2. Send and redeem application 246 may employ process 2000 in FIG. 20.

Figure 13:
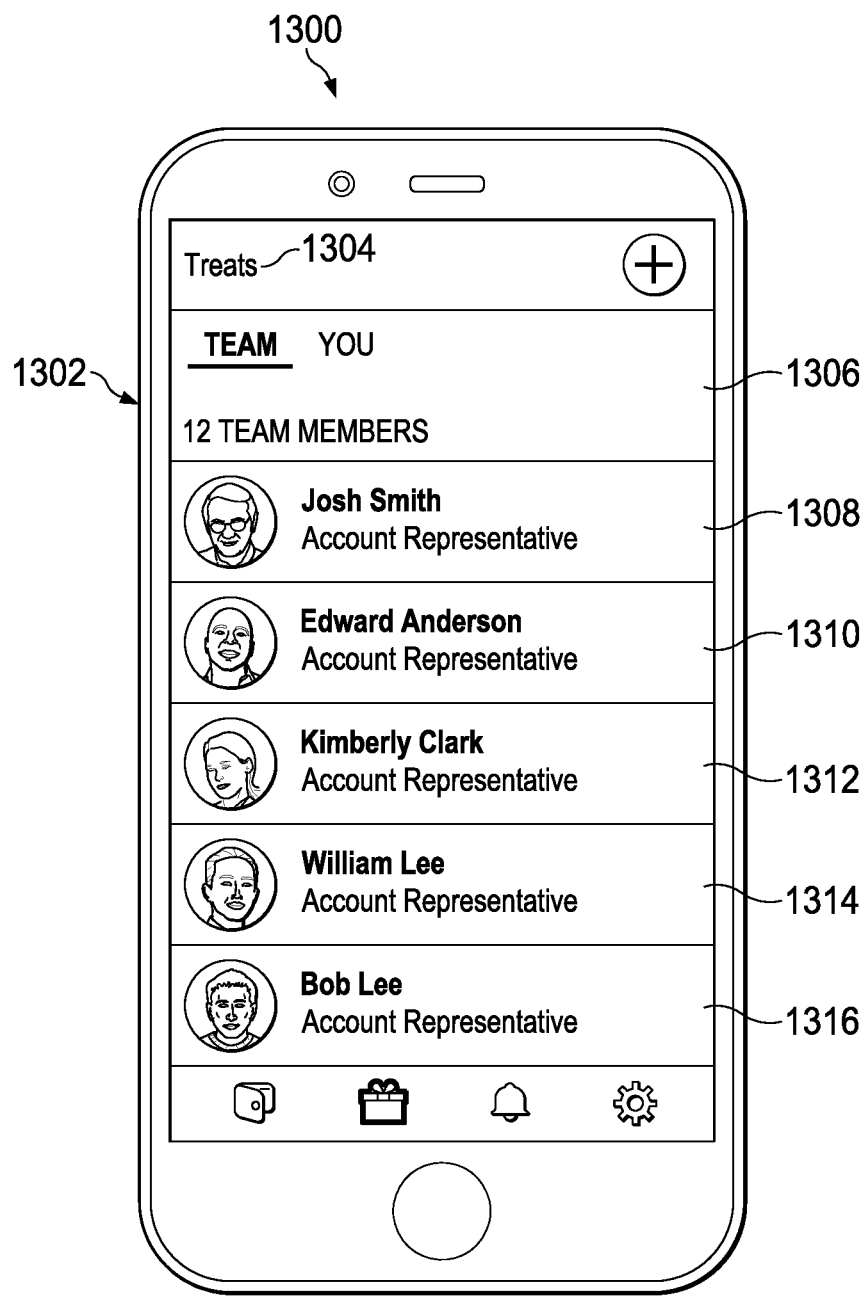
FIG. 13 is an illustration of a display for sending treats on an electronic wallet in accordance with an illustrative embodiment.

Turning to FIG. 13, an illustration of a display for sending treats to team members is depicted in accordance with an illustrative embodiment. Electronic wallet 1300 is shown with treats display 1304 in mobile device 1302. Team members 1306 comprises first team member 1308, second team member 1310, third team member 1312, fourth team member 1314, and fifth team member 1316 are shown out of a total of twelve team members. Additional team members may be displayed by swiping the display up to scroll for additional team members. Using treats display 1302, a user may find team members and award them gifts or cash from any of the accounts in electronic wallet 1300. The user may manage or receive gifts or cash from other electronic account members. Electronic wallet 1300 may be configured by team reward application 250 in FIG. 2. Team reward application 250 may employ process 2100 in FIG. 21.

Figure 14:
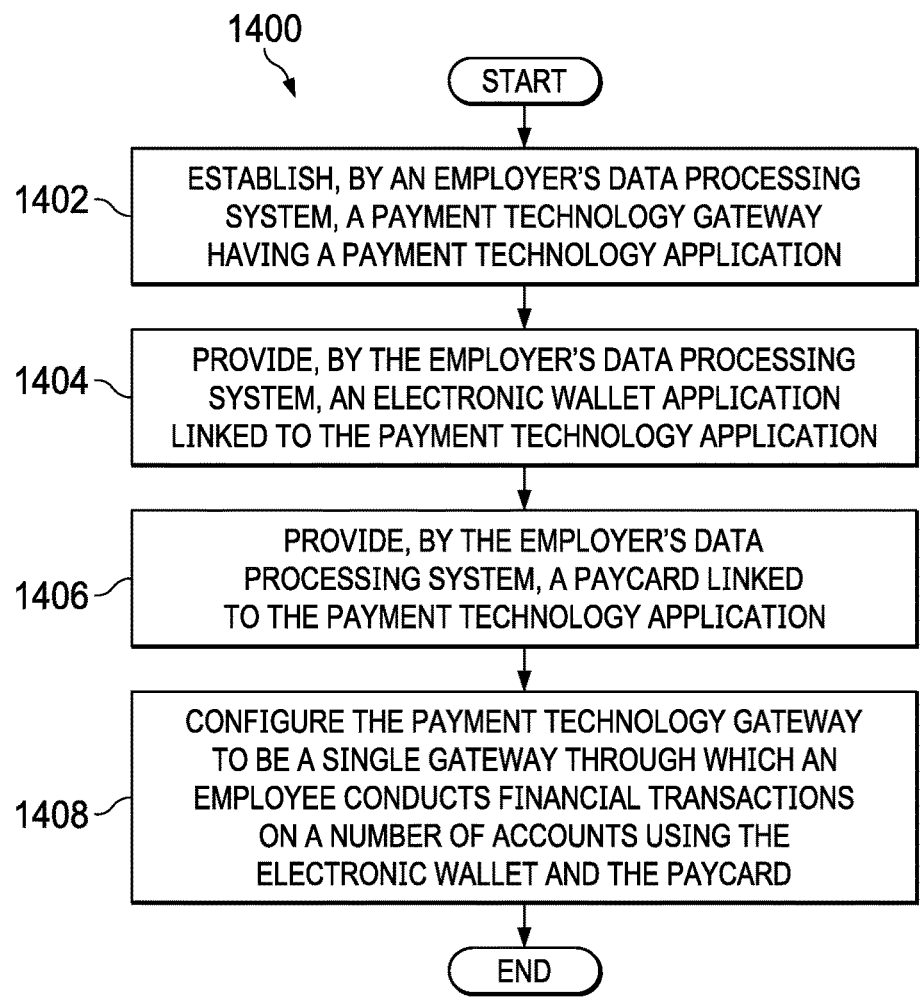
FIG. 14 is a flowchart of a process for a computer-implemented method for consolidating financial transactions in accordance with an illustrative embodiment.

Turning to FIG. 14, a flowchart of a process for a computer-implemented method for consolidating financial transactions of an employee in a payment technology gateway is depicted in accordance with an illustrative embodiment. Process 1400 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1400 can be implemented by data processing system 2400 in FIG. 24 and a processing unit such as processor unit 2404 in FIG. 24.

Process 1400 starts. A payment technology gateway having a payment technology application is established by an employer's data processing system (step 1402). The employer's data processing system provides an electronic wallet application linked to the payment technology application (step 1404). The employer's data processing system provides a paycard linked to the payment technology application (step 1406). The payment technology gateway is configured to be a single gateway through which an employee conducts financial transactions on a number of accounts using the electronic wallet and the paycard so that each financial transaction is validated by the payment technology gateway using a single payment number (step 1408). Process 1400 ends thereafter. The payment technology gateway may be payment technology gateway 230 in FIG. 2.

Figure 15:
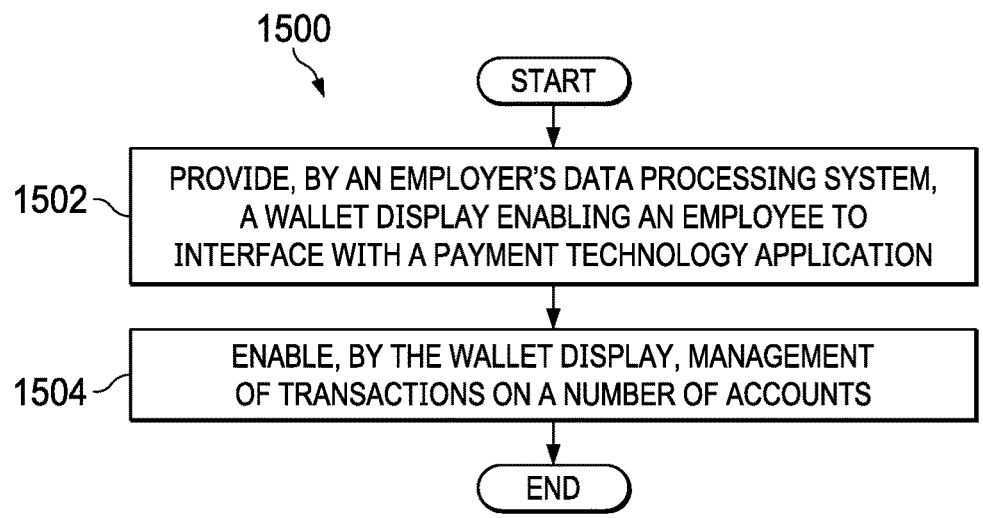
FIG. 15 is a flowchart of a process for enabling management of a number of accounts on an electronic wallet in accordance with an illustrative embodiment.

Turning to FIG. 15, a flowchart of a process for enabling management of a number of accounts on an electronic wallet is depicted in accordance with an illustrative embodiment. Process 1500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1500 can be implemented by data processing system 2400 in FIG. 24 and a processing unit such as processor unit 2404 in FIG. 24.

Process 1500 starts. An employer's data processing system provides a wallet display enabling an employee to interface with a payment technology application (step 1502). An interface may be with payment technology application 230 and the interface may be payment technology gateway 292 in FIG. 2. The wallet display enables management of transactions on a number of accounts (step 1504). Process 1500 ends. The number of accounts may include credit card accounts, bank accounts, personal identification, insurance accounts, mortgage accounts, and FSH accounts and HSA accounts. The wallet display may be downloadable to a portable device by one of an internet connection and a wireless connection. The payment technology application may be payment technology gateway application 230 in FIG. 2.

Figure 16:
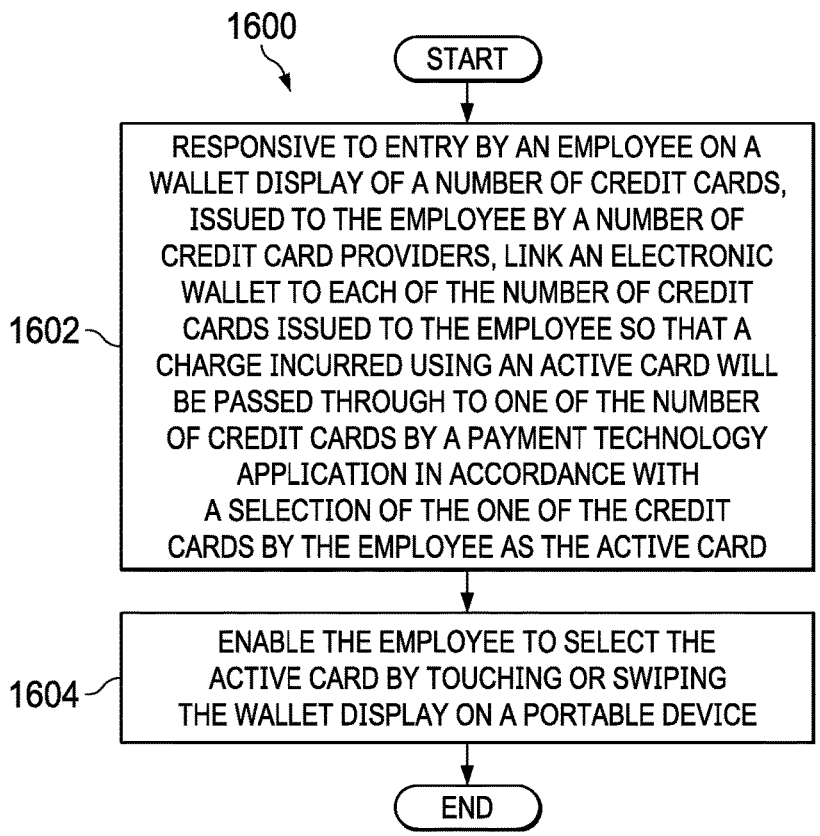
FIG. 16 is a flowchart of a process for linking credit cards to an electronic wallet and enabling selection of an active card on the electronic wallet in accordance with an illustrative embodiment.

Turning to FIG. 16, a flowchart of a process for linking credit cards to an electronic wallet and enabling a selection of an active card on the electronic wallet is depicted in accordance with an illustrative embodiment. Process 1600 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1600 can be implemented by data processing system 2400 in FIG. 24 and a processing unit such as processor unit 2404 in FIG. 24.

Process 1600 starts. Responsive to entry by an employee on a wallet display of a number of credit cards issued to the employee by a number of credit card providers, an electronic wallet is linked to each of the number of credit cards issued to the employee so that a charge incurred using an active card will be passed through to one of the number of credit cards by a payment technology gateway application in accordance with a selection of one of the number of credit cards by the employee as the active card (step 1602). The employee is enabled to select the active card by touching or swiping the wallet display on a portable device (step 1604). Process 1600 ends. The portable device may be an electronic wallet such as electronic wallet 604 in FIG. 6.

Figure 17:
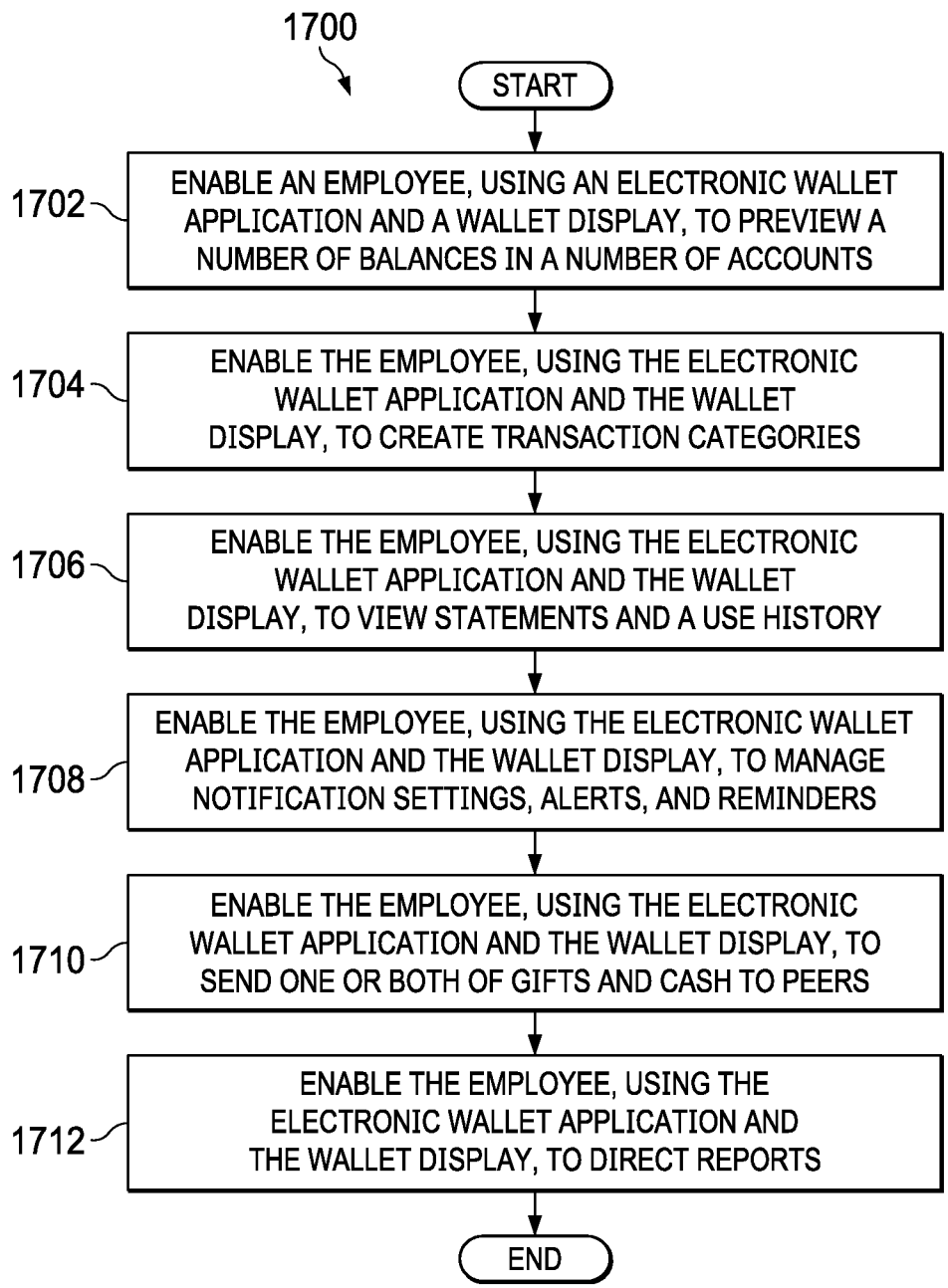
FIG. 17 is a flowchart of a process for previewing balances, viewing accounts, managing settings, alerts, and notifications, and directing reports in accordance with an illustrative embodiment.

Turning to FIG. 17, a flowchart of a process for previewing balances, viewing accounts, managing settings, alerts, and notifications, and directing reports is depicted in accordance with an illustrative embodiment. Process 1700 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1700 can be implemented by data processing system 2400 in FIG. 24 and a processing unit such as processor unit 2404 in FIG. 24.

Process 1700 starts. An employee, using an electronic wallet application and a wallet display, is enabled to preview a number of balances in a number of accounts (step 1702). The employee, using the electronic wallet application and the wallet display, is enabled to create transaction categories (step 1704). The employee, using the electronic wallet application and the wallet display, is enabled to view statements and a use history (step 1706). The employee, using the electronic wallet application and the wallet display, is enabled to manage notification settings, alerts, and reminders (step 1708). The employee, using the electronic wallet application and the wallet display, is enabled to send one or both of gifts and cash to peers (step 1710). The employee, using the electronic wallet application and the wallet display, is enabled to direct reports (step 1712). Process 1700 ends. The electronic wallet may be electronic wallet 604 in FIG. 6.

Turning to FIG. 18, a flowchart of a process for using a card interface to link a number of cards to a paycard is depicted in accordance with an illustrative embodiment. Process 1800 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1800 can be implemented by data processing system 2400 in FIG. 24 and a processing unit such as processor unit 2404 in FIG. 24.

Process 1800 starts. A card interface is provided for data entry by an employee (step 1802). Responsive to entry by the employee on the card interface of a number of credit cards issued to the employee by a number of credit card providers, a paycard is linked to each of the number of credit cards issued to the employee so that a charge incurred using the paycard will be passed through to one of the number of credit cards by a payment technology application in accordance with a pre-designated policy selected by the employee (step 1804). Process 1800 ends thereafter. The card interface may be one of a computer card interface or a mobile device interface. The paycard may include an EMV chip. The paycard may be paycard 810 or paycard 812 in FIG. 8.

Turning to FIG. 19, a flowchart of a process for enabling an electronic wallet as an identification card is depicted in accordance with an illustrative embodiment. Process 1900 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1900 can be implemented by data processing system 2400 in FIG. 24 and a processing unit such as processor unit 2404 in FIG. 24.

Process 1900 starts. An identification application linked to a payment technology application, an electronic wallet, and a paycard is provided (step 1902). The paycard is provided with one of passive proximity technology and contactless smart card technology (step 1904). The electronic wallet is provided with a matrix barcode for scanning (step 1906). The paycard and the electronic wallet are configured to clock an employee in and out at work (step 1908). Process 1900 ends. The electronic wallet and the identification application are configured to display a history of the employee clocking in and out (step 1910). The paycard may be paycard 810 or paycard 812 in FIG. 8.

Figure 20:
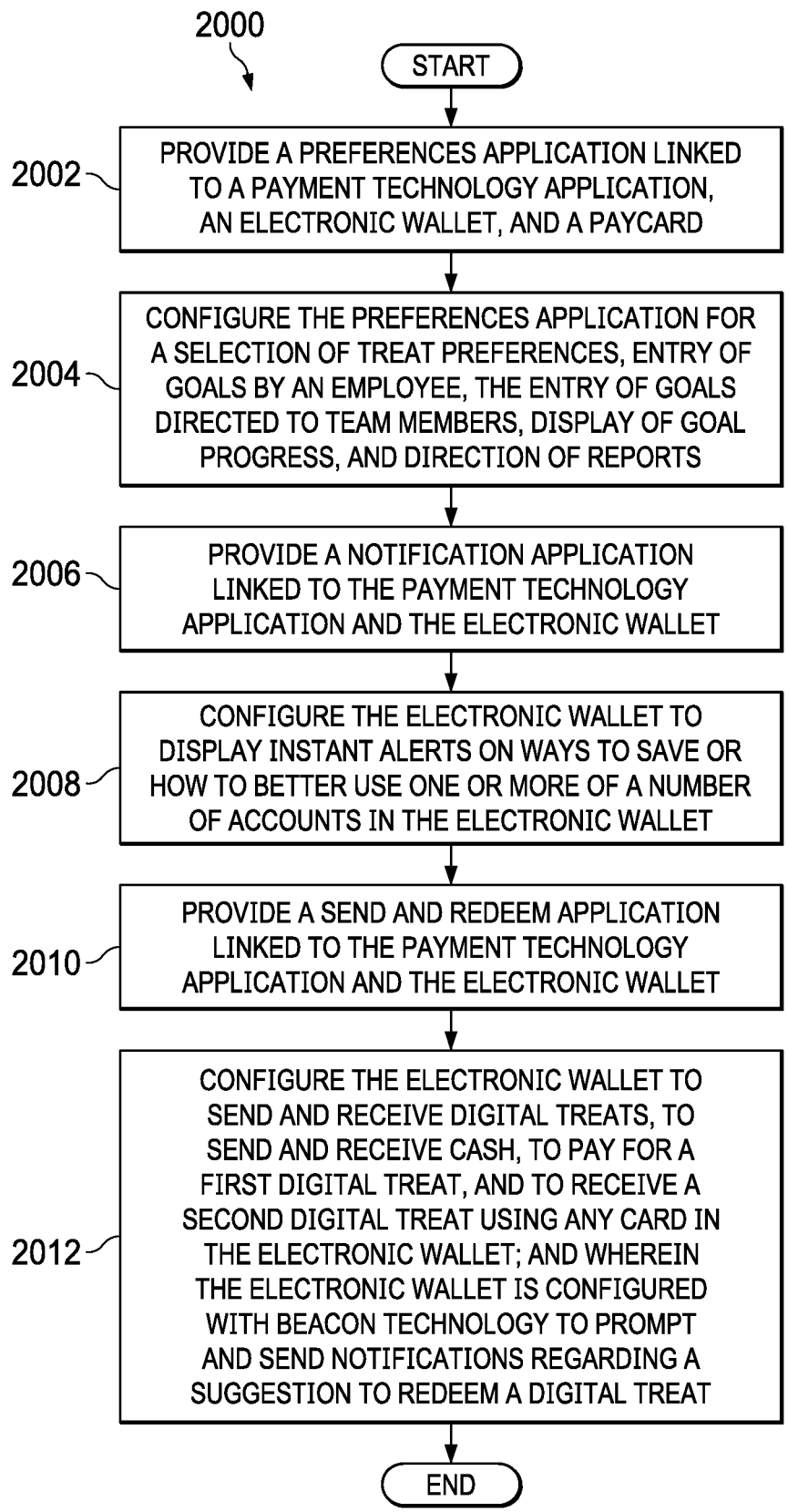
FIG. 20 is a flowchart of a process for providing preferences on an electronic wallet in accordance with an illustrative embodiment.

Turning to FIG. 20, a flowchart of a process for providing preferences on an electronic wallet is depicted in accordance with an illustrative embodiment. Process 2000 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 2000 can be implemented by data processing system 2400 in FIG. 24 and a processing unit such as processor unit 2404 in FIG. 24.

Process 2000 starts. A preferences application linked to a payment technology application, an electronic wallet, and a paycard is provided (step 2002). The preferences application is configured for a selection of treat preferences, entry of goals by an employee, the entry of goals directed to team members, display of goal progress, and direction of reports (step 2004). A notification application linked to the payment technology application and the electronic wallet is provided (step 2006). The electronic wallet is configured to display instant alerts on ways to save or how to better use one or more of a number of accounts in the electronic wallet (step 2008). A send and redeem application linked to the payment technology application and the electronic wallet is provided (step 2010). The electronic wallet is configured to send and receive digital treats, to send and receive cash, to pay for a first digital treat, and to receive a second digital treat using any card in the electronic wallet (step 2012). The electronic wallet is configured with beacon technology to prompt and send notifications regarding a suggestion to redeem a digital treat. Process 2000 ends. Process 2000 may be coded in send and redeem application 246 in FIG. 2.

Turning to FIG. 21, a flowchart of a process for providing a team reward application on an electronic wallet is depicted in accordance with an illustrative embodiment. Process 2100 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 2100 can be implemented by data processing system 2400 in FIG. 24 and a processing unit such as processor unit 2404 in FIG. 24.

Process 2100 starts. A team reward application linked to a payment technology application and an electronic wallet is provided (step 2102). Responsive to one or more inputs by an employee on a display of the electronic wallet, a team member is found, and the team member is awarded a gift or cash from any of a number of accounts in the electronic wallet (step 2104). A team reward application is configured to manage gifts or cash sent from another electronic wallet to the employee (step 2106). Process 2100 ends. Process 2100 may be coded in team reward application 254 in FIG. 2.

Turning to FIG. 22, a flowchart of a process for providing peer-to-peer payments between employees enrolled in a payment technology gateway is depicted in accordance with an illustrative embodiment. Process 2200 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 2200 can be implemented by data processing system 2400 in FIG. 24 and a processing unit such as processor unit 2404 in FIG. 24.

Process 2200 starts. A payment technology application provides a mechanism for peer-to-peer payments between employees enrolled in the payment technology gateway, wherein the mechanism employs one of an electronic wallet and a paycard (step 2202). Process 2200 ends. Peer-to-peer payments may be enabled by accounting 250 in payment and technology gateway 230.

Turning to FIG. 23, a flowchart of a process for analyzing purchases made by an employee using an electronic wallet and a paycard is depicted in accordance with an illustrative embodiment. Process 2300 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 2300 can be implemented by data processing system 2400 in FIG. 24 and a processing unit such as processor unit 2404 in FIG. 24.

Process 2300 starts. A consolidated financial transaction service is configured to analyze purchases made by an employee using an electronic wallet and a paycard and to make recommendations on how the employee may best use available funds (step 2302). Process 2300 ends.

Turning now to FIG. 24, an illustration of a block diagram of a data processing system is depicted in accordance with an illustrative embodiment. Data processing system 2400 may be used to implement one or more computers and computer system 112 in FIG. 1. In this illustrative example, data processing system 2400 includes communications framework 2402, which provides communications between processor unit 2404, memory 2406, persistent storage 2408, communications unit 2410, input/output unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation. Memory 2406 and persistent storage 2418 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer-readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408. Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least of a keyboard, a mouse, or some other suitable input device. Further, input/output unit 2412 may send output to a printer. Display 2412 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer-usable program code, or computer-readable program code that may be read and executed by a processor in processor unit 2404. The program code in the different embodiments may be embodied on different physical or computer-readable storage media, such as memory 2406 or persistent storage 2408.

Program code 2418 is located in a functional form on computer-readable media 2420 that is selectively removable and may be loaded onto or transferred to data processing system 2400 for execution by processor unit 2404. Program code 2418 and computer-readable media 2420 form computer program product 2422 in these illustrative examples. In one example, computer-readable media 2420 may be computer-readable storage media 2424 or computer-readable signal media 2426.

In these illustrative examples, computer-readable storage media 2424 is a physical or tangible storage device used to store program code 2418 rather than a medium that propagates or transmits program code 2418. Alternatively, program code 2418 may be transferred to data processing system 2400 using computer-readable signal media 2426.

Computer-readable signal media 2426 may be, for example, a propagated data signal containing program code 2418. For example, computer-readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described.

For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for consolidating financial transactions of an employee in a payment technology gateway, the computer-implemented method comprising:
   establishing, by a data processing system comprising one or more processors coupled with memory, the payment technology gateway having a payment technology gateway application linked to a payroll application of the employee;
   providing, by the data processing system, an electronic wallet application linked to the payment technology gateway application, the electronic wallet application comprising an electronic wallet comprising a paycard of the employee and an identification card of the employee, the electronic wallet configured to facilitate financial transactions on a number of accounts of the employee and clocking in and out of the employee;
   linking, by the data processing system, the paycard and the identification card with the electronic wallet application via the payment technology gateway application, the paycard comprising a payment number;
   receiving, by the data processing system, a first request to perform a first transaction with the electronic wallet application, the first request comprising the payment number assigned to the paycard;
   determining, by the data processing system, that the first transaction is a financial transaction based on the payment number or a first input or selection corresponding to the electronic wallet;
   executing, via the data processing system using the payment technology gateway, responsive to the determination that the first transaction is a financial transaction, the first transaction using the paycard linked to the electronic wallet;
   receiving, by the data processing system, a second request to perform a second transaction with the electronic wallet application;
   determining, by the data processing system, that the second transaction is a clock in or clock out transaction based on a second input or selection corresponding to the electronic wallet; and
   executing, by the data processing system, responsive to the determination that the second transaction is a clock in or clock out transaction, the second transaction using the identification card linked to the electronic wallet.

2. The computer-implemented method of claim 1, further comprising:
   providing, by the data processing system, a wallet display for the employee to interface with the payment technology gateway application;
   providing, by the data processing system, using the wallet display, an indication of the financial transactions on the number of accounts to the employee;
   wherein the number of accounts includes credit card accounts, bank accounts, personal identification, insurance accounts, mortgage accounts, and FSH accounts and HSA accounts;
   wherein the wallet display is downloadable to a portable device by one of an internet connection and a wireless connection.

3. The computer-implemented method of claim 2, wherein providing, by the data processing system, the wallet display for the employee to interface with the payment technology gateway application further comprises:
   responsive to an entry by the employee on the wallet display of a number of credit cards issued to the employee by a number of credit card providers, linking, by the data processing system, the electronic wallet to each of the number of credit cards issued to the employee so that a charge incurred using an active card will be passed through to one of the number of credit cards by the payment technology gateway application in accordance with a selection of one of the number of credit cards by the employee as the active card; and
   receiving, by the data processing system, the selection of one of the number of credit cards responsive to the employee touching or swiping the wallet display on the portable device.

4. The computer-implemented method of claim 3, further comprising:
   providing, by the data processing system, using the electronic wallet application and the wallet display, a preview to the employee of a number of balances in the number of accounts;
   creating, by the data processing system, using the electronic wallet application and the wallet display, transaction categories of the employee;
   providing, by the data processing system, using the electronic wallet application and the wallet display, statements and a use history to the employee;
   providing, using the electronic wallet application and the wallet display, notification settings, alerts, and reminders to the employee;
   sending, by the data processing system, using the electronic wallet application and the wallet display, one or both of gifts and cash to peers of the employee; and
   directing, by the data processing system, using the electronic wallet application and the wallet display, reports of the employee.

5. The computer-implemented method of claim 1, wherein linking, by the data processing system, the paycard to the payment technology gateway application, further comprises:
   providing, by the data processing system, a card interface for receiving data entered by the employee;
   responsive to an entry by the employee on the card interface of a number of credit cards issued to the employee by a number of credit card providers, linking, by the data processing system, the paycard to each of the number of credit cards issued to the employee so that a charge incurred using the paycard will be passed through to one of the number of credit cards by the payment technology gateway application in accordance with a pre-designated policy selected by the employee;
   wherein the card interface is one of a computer card interface and a mobile device interface.

6. The computer-implemented method of claim 5, the paycard comprising an EMV chip.

7. The computer-implemented method of claim 1, further comprising:
displaying, by the data processing system, using the electronic wallet and an identification application, a history of the employee clocking in and out.

8. The computer-implemented method of claim 1, further comprising:
providing, by the data processing system, a preferences application linked to the payment technology gateway application and the electronic wallet;
receiving, by the data processing system, using the preferences application, a selection of treat preferences, an entry of goals by the employee, the entry of goals directed to team members, a display of goal progress, and a direction of reports.

9. The computer-implemented method of claim 1, further comprising:
providing, by the data processing system, a notification application linked to the payment technology gateway application and the electronic wallet;
displaying, by the data processing system, using the electronic wallet, instant alerts on ways to save or how to better use one or more of the number of accounts in the electronic wallet.

10. The computer-implemented method of claim 1, further comprising:
providing, by the data processing system, a send and redeem application linked to the payment technology gateway application and the electronic wallet;
wherein the electronic wallet is configured to send and receive digital treats; send and receive cash;
pay for a first digital treat; and receive a second digital treat using any card in the electronic wallet; and
wherein the electronic wallet is configured with beacon technology to prompt and send notifications regarding a suggestion to redeem a digital treat.

11. The computer-implemented method of claim 1, further comprising:
providing, by the data processing system, a team reward application linked to the payment technology gateway application and the electronic wallet; and
responsive to one or more inputs by the employee on a display of the electronic wallet, finding, by the data processing system, a team member and awarding the team member a gift or cash from any of the number of accounts in the electronic wallet;
providing, by the data processing system, using the team reward application, an indication of the gift or the cash sent from another electronic wallet to the employee.

12. The computer-implemented method of claim 1, further comprising:
providing, by the data processing system, using the payment technology gateway application, a mechanism for peer-to-peer payments between employees enrolled in the payment technology gateway using the electronic wallet.

13. The computer-implemented method of claim 1, further comprising:
analyzing, by the data processing system, using a consolidated financial transaction service, purchases made by the employee using the electronic wallet and the paycard; and
providing, by the data processing system, using the consolidated financial transaction service, recommendations for using available funds to the employee.

14. A system for consolidating transactions of an employee in a payment technology gateway, the system comprising:
a data processing system comprising one or more processors coupled with memory, the data processing system connected to a network, a number of internal databases, and a number of external data sources;
the payment technology gateway:
running on the one or more processors of the data processing system; and
having a payment technology gateway application linked to a payroll application of the employee; and
computer program instructions stored in a computer-readable storage media of the data processing system and configured to cause the one or more processors to:
provide an electronic wallet application linked to the payment technology gateway, the electronic wallet application comprising an electronic wallet comprising a paycard of the employee and an identification card of the employee, the electronic wallet configured to facilitate financial transactions on a number of accounts of the employee and clocking in and out of the employee;
link the paycard and the identification card with the electronic wallet application via the payment technology gateway application, the paycard comprising a payment number;
receive a first request to perform a first transaction with the electronic wallet application, the first request comprising the payment number assigned to the paycard;
determine that the first transaction is a financial transaction based on the payment number or a first input or selection corresponding to the electronic wallet;
execute, using the payment technology gateway, responsive to the determination that the first transaction is a financial transaction, the first transaction using the paycard linked to the electronic wallet;
receive a second request to perform a second transaction with the electronic wallet application;
determine that the second transaction is a clock in or clock out transaction based on a second input or selection corresponding to the electronic wallet; and
execute, responsive to the determination that the second transaction is a clock in or clock out transaction, the second transaction using the identification card linked to the electronic wallet.

15. The system of claim 14, further comprising:
a card interface to receive data entered by the employee;
the computer program instructions further causing the one or more processors to, responsive to an entry by the employee on the card interface of a number of credit cards, issued to the employee by a number of credit card providers, to link the paycard to each of the number of credit cards issued to the employee so that a charge incurred using the paycard will be passed through to one of the number of credit cards by the payment technology gateway application in accordance with a pre-designated policy selected by the employee.

16. The system of claim 15, the computer program instructions further causing the one or more processors to:
provide, using the electronic wallet application and a wallet display, a preview to the employee of a number of balances in the number of accounts;
create, using the electronic wallet application and the wallet display, transaction categories of the employee;

provide, using the electronic wallet application and the wallet display, statements and a use history of the employee;

provide, using the electronic wallet application and the wallet display, notification settings, alerts, and reminders to the employee;

send, using the electronic wallet application and the wallet display, one or both of gifts and cash to peers of the employee; and direct, using the electronic wallet application and the wallet display, reports of the employee.

17. The system of claim 16, the computer program instructions further causing the one or more processors to:

display, using the electronic wallet and an identification application, a history of the employee clocking in and out.

18. A computer program product for consolidating transactions of an employee in a payment technology gateway, the computer program product comprising:

computer program instructions stored in a non-transitory computer-readable storage media of a data processing system and configured to cause one or more processors to:

establish the payment technology gateway having a payment technology gateway application linked to a payroll application of the employee;

provide an electronic wallet application linked to the payment technology gateway application, the electronic wallet application comprising an electronic wallet comprising a paycard of the employee and an identification card of the employee, the electronic wallet configured to facilitate financial transactions on a number of accounts of the employee and clocking in and out of the employee;

link the paycard and the identification card with the electronic wallet application via the payment technology gateway application, the paycard comprising a payment number;

receive a first request to perform a first transaction with the electronic wallet application, the first request comprising the payment number assigned to the paycard;

determine that the first transaction is a financial transaction based on the payment number or a first input or selection corresponding to the electronic wallet;

execute, using the payment technology gateway, responsive to the determination that the first transaction is a financial transaction, the first transaction using the paycard linked to the electronic wallet;

receive a second request to perform a second transaction with the electronic wallet application;

determine that the second transaction is a clock in or clock out transaction based on a second input or selection corresponding to the electronic wallet; and execute, responsive to the determination that the second transaction is a clock in or clock out transaction, the second transaction using the identification card linked to the electronic wallet.

19. The computer program product of claim 18, the computer program instructions further causing the one or more processors to:

provide a card interface to receive data entered by the employee; and responsive to an entry by the employee on the card interface of a number of credit cards, issued to the employee by a number of credit card providers, link the paycard to each of the number of credit cards issued to the employee so that a charge incurred using the paycard will be passed through to one of the number of credit cards by the payment technology gateway application in accordance with a pre-designated policy selected by the employee;

wherein the card interface is one of a computer card interface and a mobile device interface; and wherein the paycard includes an EMV chip.

20. The computer program product of claim 19, the computer program instructions further causing the one or more processors to:

provide a preview to the employee of a number of balances in the number of accounts;

create transaction categories of the employee;

provide statements and a use history to the employee;

provide, using the electronic wallet application and a wallet display, notification settings, alerts, and reminders to the employee;

send, using the electronic wallet application and the wallet display, one or both of gifts and cash to peers of the employee; and direct, using the electronic wallet application and the wallet display, reports of the employee.

* * * * *